US012718375B1

(12) United States Patent
Nakanelua et al.

(10) Patent No.: US 12,718,375 B1
(45) Date of Patent: Aug. 25, 2026

(54) MULTI-BOUNDARY DETECTION VIA FOCAL-POINT-RELATED BOUNDARIES FOR FILTERED LIGHT

(71) Applicant: CyberSecure Innovations, LLC, Prince Frederick, MD (US)

(72) Inventors: Bobby Nakanelua, Elizabethtown, KY (US); Scott Rye, Prince Frederick, MD (US); Stephen Sohn, Cummings, GA (US)

(73) Assignee: CyberSecure Innovations, LLC, Prince Frederick, MD (US)

( * ) Notice: Subject to any disclaimer, the term of this patent is extended or adjusted under 35 U.S.C. 154(b) by 862 days.

(21) Appl. No.: 18/170,472

(22) Filed: Feb. 16, 2023

(51) Int. Cl.
*G06T 7/10* (2017.01)
*G01D 5/26* (2006.01)
*G06T 7/90* (2017.01)

(52) U.S. Cl.
CPC ............... *G06T 7/10* (2017.01); *G01D 5/268* (2013.01); *G06T 7/90* (2017.01); *G06T 2207/20081* (2013.01); *G06T 2207/30232* (2013.01)

(58) Field of Classification Search
CPC ... G06T 7/10; G06T 7/90; G06T 2207/20081; G06T 2207/30232; G01D 5/268
USPC ........................................................ 702/189
See application file for complete search history.

(56) References Cited

U.S. PATENT DOCUMENTS

2011/0273719 A1* 11/2011 Froggatt ............ G01B 9/02004 356/446
2025/0044528 A1* 2/2025 Nakanelua ........... H04B 10/071

* cited by examiner

*Primary Examiner* — Aditya S Bhat
(74) *Attorney, Agent, or Firm* — Foley & Lardner LLP

(57) ABSTRACT

In some embodiments, a focal point and a background of a filtered light (e.g., captured by a sensor at a first time) may be detected, where the filtered light is light from light emitted from a fiber optic cable that passes through one or more light filters. First reference coordinates for a first boundary around the focal point and second reference coordinates for a second boundary may be determined. As an example, the second boundary may be farther from a center of the focal point than the first boundary and a subset of the background. Subsequent to storing the first and second reference coordinates, one or more activities may be detected based on the stored first and second reference coordinates and subsequent filtered light (e.g., the filtered light captured by the sensor after the first time).

20 Claims, 23 Drawing Sheets
(14 of 23 Drawing Sheet(s) Filed in Color)

Focal Point – Laser Scatter Signal

Outer Section – Laser Scatter Signal

Focal Point – Laser Signal

Outer Section – Laser Signal

Focal Point – "No Laser" Signal

Outer Section – "No Laser" Signal

Focal Point – Laser Scatter Signal

Outer Section – Laser Scatter Signal

Focal Point – Laser Signal

Outer Section – Laser Signal

Focal Point – "No Laser" Signal

Outer Section – "No Laser" Signal

Focal Point – Laser Scatter Signal

Outer Section – Laser Scatter Signal

Focal Point – Laser Signal

Outer Section – Laser Signal

Focal Point – “No Laser” Signal

Outer Section – “No Laser” Signal

Focal Point – Laser Scatter Signal

Outer Section – Laser Scatter Signal

Focal Point – Laser Signal

Outer Section – Laser Signal

Focal Point – "No Laser" Signal

Outer Section – "No Laser" Signal

Focal Point – Laser Scatter Signal

Outer Section – Laser Scatter Signal

Focal Point – Laser Signal

Outer Section – Laser Signal

Focal Point – "No Laser" Signal

Outer Section – "No Laser" Signal

MULTI-BOUNDARY DETECTION VIA FOCAL-POINT-RELATED BOUNDARIES FOR FILTERED LIGHT

SUMMARY

Methods and systems are described herein for improvements related to detection of activities based on light captured by one or more sensors. As one example, methods and systems are described herein for detecting one or more activities based on filtered light and multiple focal-point-related boundaries. With respect to existing light-based activity detection systems, for example, activity detection is generally performed by monitoring electrical signals from components such as photodiodes (e.g., the detector component) to measure the intensity of a light source (e.g., a laser source) and output an electronic signal related to the measurement. In the context of intrusion detection, such existing systems will typically measure laser signal strength, Fresnel reflections, and Rayleigh backscatter either directly from the signal or from reflected laser signal. Such existing systems, however, typically require specialized and complex hardware (e.g., optical interrogation devices, Fabry-Pérot (FP) lasers, precise pulse generators, etc.) to do so that are costly or introduce other constraints (e.g., distributed acoustic sensing has limited dynamic range).

To address one or more of the foregoing issues, in some embodiments, a focal point of a filtered light (e.g., captured by a camera or other sensor at a first time) may be detected, where the filtered light is light that passes through one or more light filters (e.g., from light emitted from a fiber optic cable). First reference coordinates for a first boundary around the focal point and second reference coordinates for a second boundary around the first boundary may be determined. Subsequent to storing the first and second reference coordinates, one or more activities may be detected based on the stored first and second reference coordinates and subsequent filtered light (e.g., the filtered light captured by the camera or other sensor after the first time). As an example, with respect to laser coming from the fiber optic cable, one or more of the filters may act to disburse or diffuse the laser (e.g., via one or more translucent filters), which can make changes in the laser more noticeable. In one use case, at least one translucent filter may be arranged between 10-20 mm from the camera to facilitate such diffusion of the laser prior to the filtered light being captured by the camera. In this way, for example, images captured by a typical commercial camera may be used to detect changes in the laser coming from the fiber optic cable without necessarily requiring one or more specialized and complex hardware (e.g., without requiring the use of Fiber Bragg grating sensors, optical interrogation devices, FP lasers, precise pulse generators, etc.).

In some embodiments, the second boundary (or its reference coordinates) may be farther from a center of the focal point than the first boundary (or its reference coordinates), where the second boundary corresponds to a subset of the background of the filtered light. As an example, the first reference coordinates for the first boundary may be used to efficiently detect a focal point of subsequent filtered light and extract data related to the focal point or other light within the first boundary. The second reference coordinates for the second boundary may be used to efficiently detect a given portion of the background around the focal point and extract data related to the focal point or other light within the second boundary. In some embodiments, such derived data related to the first and second boundaries may then be used to monitor for one or more activities (e.g., an intrusion event or other adverse event) without requiring the extraction or subsequent processing of data extracted from the remainder of the background, thereby reducing computation resource usage (and, thus, increasing the efficiency of the system). Additionally, or alternatively, in scenarios involving the use of one or more translucent filters (e.g., where the light may be overly diffused), limiting the data to the second boundary (or another subset of the background) may reduce the use of data that overly exaggerates or obfuscates changes occurring in the unfiltered light (e.g., for training or configuring a prediction model or as input to the prediction model to obtain predictions), thereby increasing accuracy of predictions.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
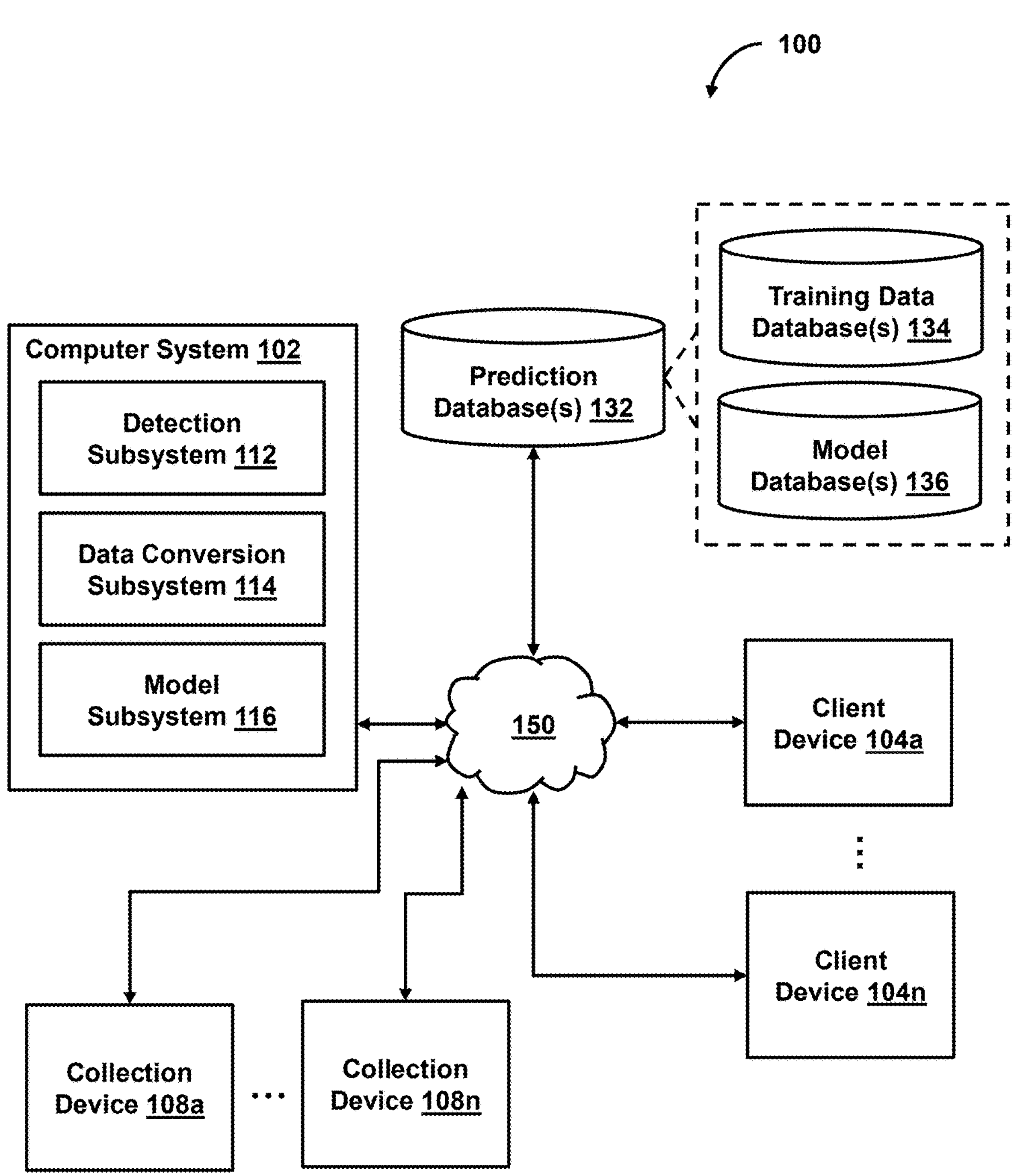
FIG. 1 shows a system for facilitating activity detection via filtered light, in accordance with one or more embodiments.

FIG. 1 shows a system 100 for facilitating view augmentation, in accordance with one or more embodiments. As shown in FIG. 1, system 100 may include computer system 102, client device 104 (or client devices 104*a*-104*n*), or other components. Computer system 102 may include detection subsystem 112, data conversion subsystem 114, model subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

As discussed, many existing light-based activity detection systems perform activity detection by monitoring electrical signals from components such as photodiodes (e.g., the detector component) to measure the intensity of a light source (e.g., a laser source) and output an electronic signal related to the measurement. In the context of intrusion detection, such existing systems will typically measure laser signal strength, Fresnel reflections, and Rayleigh backscatter either directly from the signal or from reflected laser signal. Such existing systems, however, typically require specialized and complex hardware (e.g., Fiber Bragg grating sensors, optical interrogation devices, FP lasers, precise pulse generators, etc.) to do so that are costly or introduce other constraints (e.g., distributed acoustic sensing has limited dynamic range).

In some embodiments, system 100 may perform activity detection by monitoring a filtered light (e.g., laser or other light from a fiber optic cable or other physical transmission line), where one or more filters (through which the filtered light is outputted) include a translucent filter or other filter that disburse or diffuse light entering the filter on one side to transform the light into the filtered light. As an example, with respect to laser coming from a fiber optic cable, the diffusion by the filter may make changes occurring in the laser more noticeable. In one use case, at least one translucent filter may be arranged between 10-20 mm from a camera to facilitate such diffusion of the laser prior to the filtered light being captured by the camera. In this way, for example, images captured by a typical commercial camera may be used to detect changes in the laser coming from the fiber optic cable without necessarily requiring one or more specialized and complex hardware (e.g., without requiring the use of Fiber Bragg grating sensor, optical interrogation devices, FP lasers, precise pulse generators, etc.).

In some embodiments, system 100 may perform activity detection by monitoring a filtered light based on two or more boundaries (e.g., a first boundary within the filtered light, a second boundary around the first boundary, a third boundary around the second boundary, and so on). As an example, the first boundary may be a boundary related to a focal point, and the second boundary may be farther from a center of the focal point and correspond to a subset of the background of the filtered light (e.g., the second boundary is closer to a center of the focal point than the outer edges of the background). In some embodiments, system 100 may perform activity detection based on predetermined coordinates for the boundaries. As an example, system 100 may determine and store one or more first reference coordinates for the first boundary and one or more second reference coordinates for the second boundary (e.g., in memory, in one or more databases, etc.). Subsequent to storing the first and second reference coordinates, system 100 may detect one or more activities related to filtered light based on the stored first and second reference coordinates. As an example, the first reference coordinates for the first boundary may be used to efficiently detect a focal point of subsequent filtered light and extract data related to the focal point or other light within the first boundary. The second reference coordinates for the second boundary may be used to efficiently detect a given portion of the background around the focal point and extract data related to the focal point or other light within the second boundary. In some embodiments, system 100 may then use such derived data related to the first and second boundaries to monitor for one or more activities (e.g., an intrusion event or other adverse event) without requiring the extraction or subsequent processing of data extracted from the remainder of the background, thereby reducing computation resource usage (and, thus, increasing the efficiency of the system). Additionally, or alternatively, in scenarios involving the use of one or more translucent filters (e.g., where the light may be overly diffused), limiting the data to the second boundary (or another subset of the background) may reduce the use of data that overly exaggerates or obfuscates changes occurring in the unfiltered light (e.g., for training or configuring a prediction model or as input to the prediction model to obtain predictions), thereby increasing accuracy of predictions.

In some embodiments, based on the activity detection, system 100 may perform one or more actions related to a physical transmission line. In some embodiments, system 100 may cause shutdown of network dataflow to one or more network endpoints based on the activity detection. As an example, in response to a detected disturbance on the physical information transmission line, system 100 may initiate shutdown of the network data flow to the network endpoints proximate to the detected disturbance. In one scenario, the initiation of the shutdown of the network data flow may include transmitting a port disabling command to a data flow control switch to disable a port associated with the network endpoints, rerouting at least a portion of the network data flow to avoid the network endpoints, or other actions. In some embodiments, system 100 may generate one or more alarms or other notifications based on the activity detection.

Subsystems 112-116

Figure 2A:
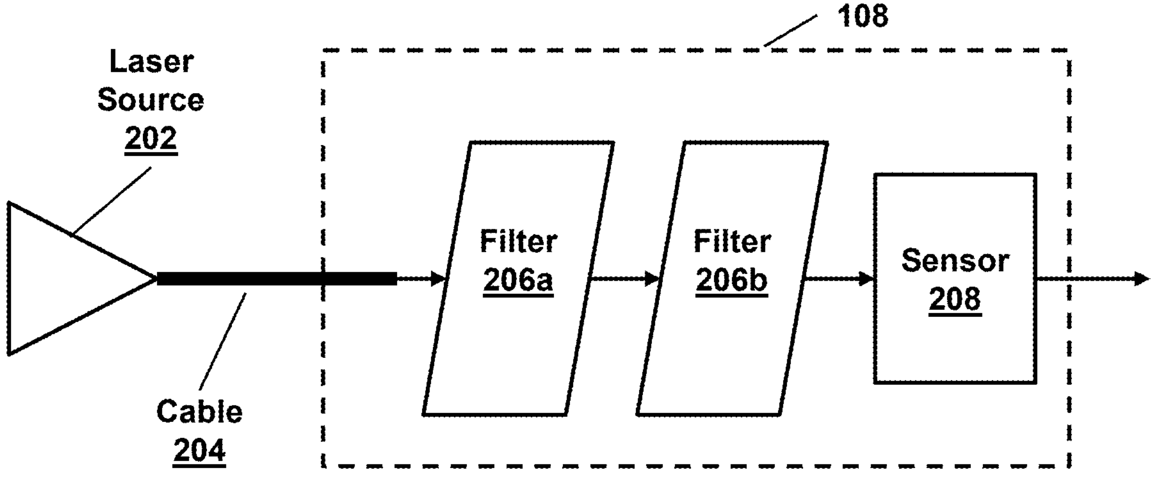
FIGS. 2A-2C show an arrangement of components related to one or more collection devices for facilitating activity detection, in accordance with one or more embodiments.

In some embodiments, detection subsystem 112 may detect a focal point, a background, or other portion of a filtered light. As an example, the filtered light may be captured by a sensor at a first time. As another example, the filtered light may be light that passes through one or more filters from light emitted from a fiber optic cable or other light carrier or emitter (e.g., used as part of a physical transmission line or other system). As another example, the filtered light may be a second filtered light captured by a camera or other sensor, where the second filtered light is light that passes through a second filter from a first filtered light, and where the first filtered light is light that passes through a first filter from light emitted from the fiber optic cable. In one scenario, with respect to FIG. 2A, laser source 202 may emit a laser signal through fiber optic cable 204, and an output end of fiber optic cable 204 may be configured to direct the laser signal toward filter 206*a* (e.g., the first filter). Light that passes through filter 206*a* (e.g., not absorbed or reflected by filter 206*a*) may continue toward filter 206*b* (e.g., the second filter), and light that passes through filter 206*b* may continue toward sensor 208 (or sensor unit 208) (e.g., a camera or other light sensor). Sensor 208 will capture and process the filtered light from filter 206*b* and output sensor data (e.g., one or more images in the form of an image stream or other data) to one or more processing units. In some embodiments, filters 206*a* and 206*b* may be arranged such that (i) filter 206*a* primarily acts to disburse and diffuse the light emitted from the fiber optic cable 204 and (ii) filter 206*b* accepts the filtered light from filter 206*a* and primarily acts as a projection screen for sensor 208.

In a further scenario, detection subsystem 112 may process the sensor data to determine a location of the focal point of the filtered light at one or more given times. As an example, detection subsystem 112 may determine the location of the focal point based on light intensity data or other characteristics related to the focal point. As a further example, although the laser signal from laser source 202 may appear to be only a specific color (e.g., red), and the laser scatter in the background of the filtered light may visibly appear as the same color (e.g., red in the image data), the filters combined with the concentration of light at the focal point cause the focal point to visibly appear as a different color (e.g., white or yellow) to sensor 208. As such, detection subsystem 112 may additionally or alternatively determine the location of the focal point based on color data related to the focal point (e.g., detecting the focal point based on the focal point being within a first color threshold range of a first predetermined color, based on the focal point being outside a second threshold range of the laser scatter color or a second predetermined color, etc.).

Figure 2B:
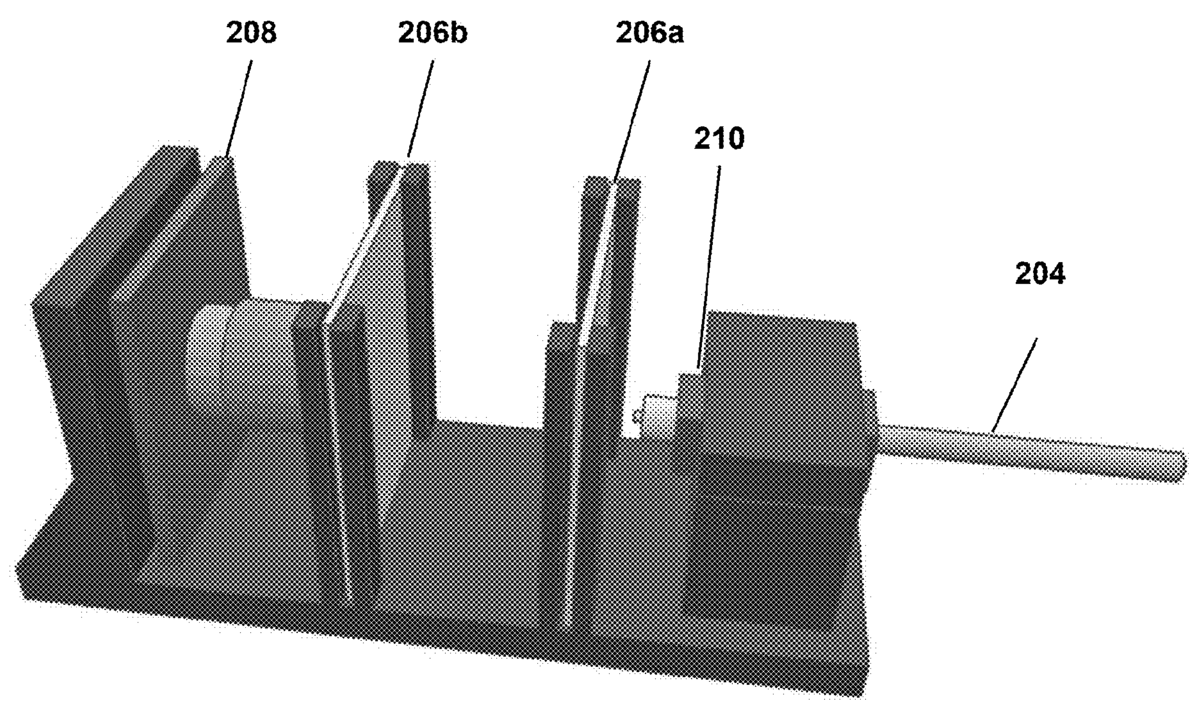
Figure 2C:
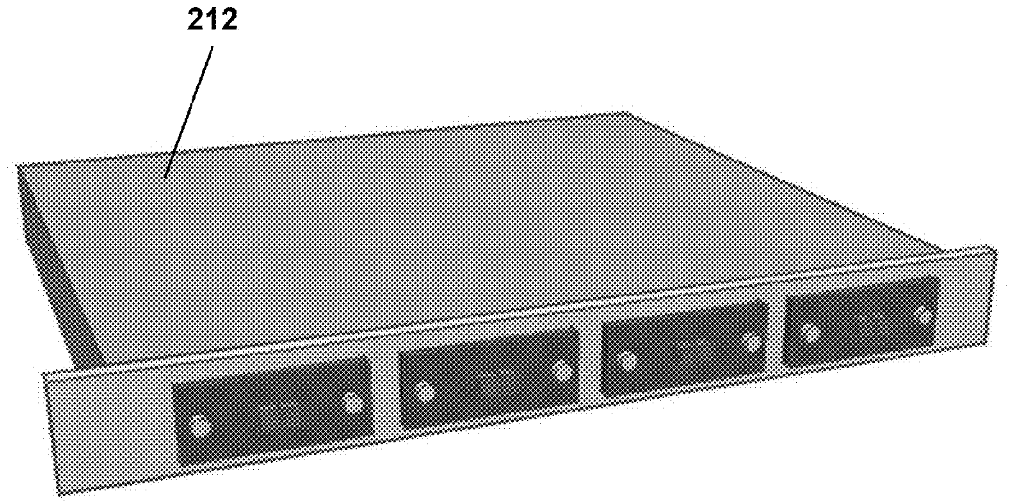

In another scenario, with respect to FIG. 2B, filters 206*a* and 206*b* (or other filters), sensor 208, cable input opening 210, or other components (e.g., one or more processing units) may be arranged as part of collection device 108. As another scenario, with respect to FIG. 2C, each collection device of collection devices 108*a*-108*d* may be a modular device (e.g., a card or other device), and collection devices 108*a*-108*d* may be arranged in an enclosure 212. In a further scenario, the components of each collection device 108 may individually be within its own enclosure (not shown).

Figure 3A:
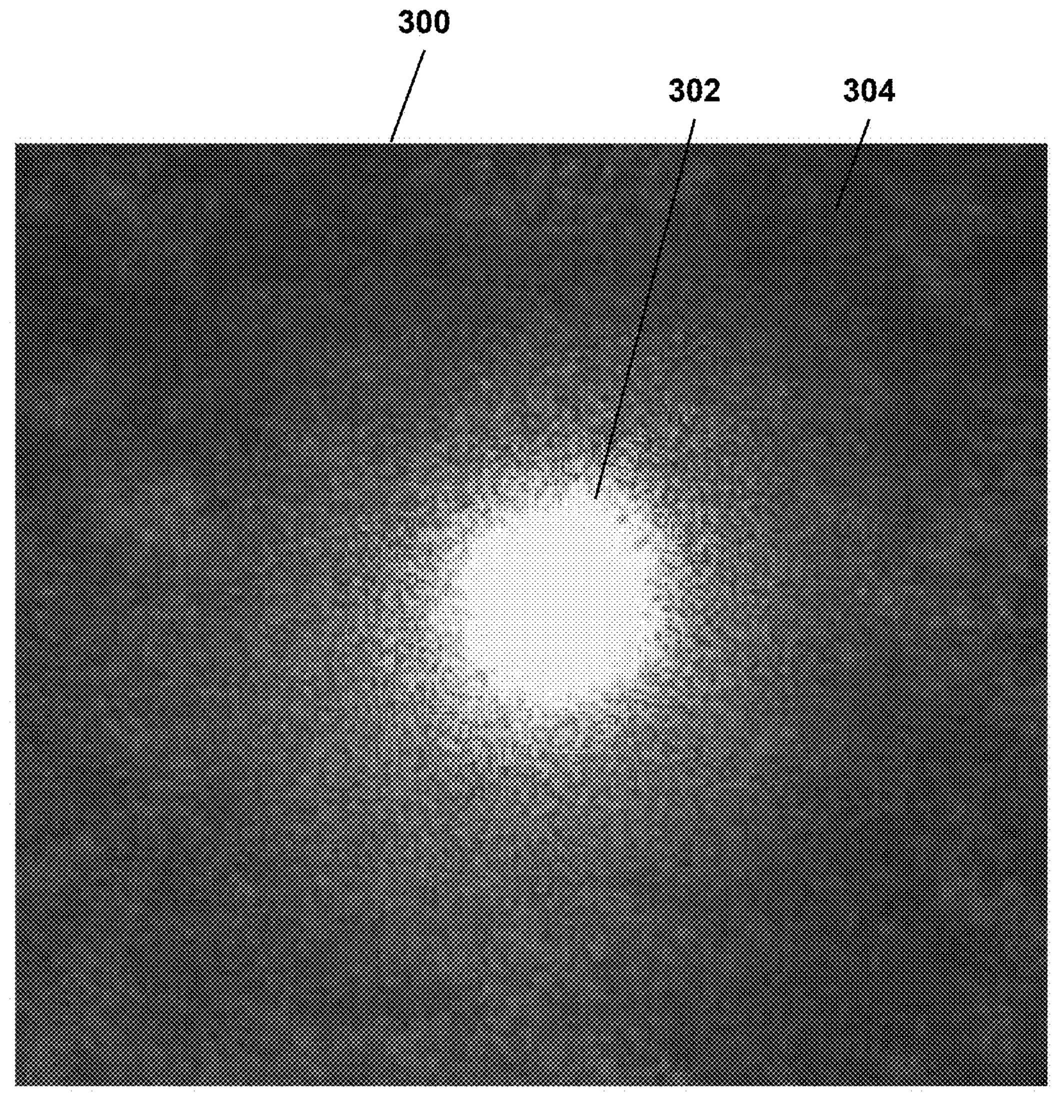
FIG. 3A shows an example of an image of filtered light captured by a collection device, in accordance with one or more embodiments.

In some embodiments, detection subsystem 112 may process a filtered light that has passed through one or more translucent filters through which emitted light (e.g., from a fiber optic cable or other light carrier or emitter) travels. As an example, each of the translucent filters may have different indices of refraction, thereby transforming light as it passes through the translucent filter. As another example, each of the translucent filters may be 5-20 mils thick (e.g., 8 mils, 10 mils, 12 mils, 14 mils, 16 mils, etc.). As another example, the translucent filters may be made of mylar or acrylic plastic material (e.g., a mylar or acrylic plastic film). In one use case, with respect to FIG. 3A, the focal point 302 visibly appears to be a white or yellow color within image 300 as a result of being transformed by one or more translucent filters (e.g., one or more of filters 206*a* and 206*b* of FIGS. 2A-2B may be a translucent filter). Moreover, the background pattern 304 of the filtered light (or transformed light) within image 300 resulted from the reflections and refractions that occur as the laser travels through a fiber optic cable and is further transformed by one or more translucent filters.

In some embodiments, two or more translucent filters (e.g., between 8-14 mils thick) may be used, where the filters are separated from one another by a distance of 10-20 mm (e.g., 14 mm, 15 mm, 16 mm, 17 mm, 18 mm, etc.). In particular, the spacing of the filters may be important because different distances between the filters will result in different patterns, distribution of light, or contrast of colors (e.g., between the focal point and the background light scatter), which can impact the performance of a detection algorithm or model. In one use case, with respect to FIGS. 2A-2B, filters 206*a* and 206*b* may both be translucent filters and may be separated by a distance of 14-18 mm. In another use case, filter 206*b* may be arranged in the collection device 108 to be closer to sensor 208. As an example, a surface of filter 206*b* may be 1-4 mm (e.g., 2 mm, 3 mm, etc.) from sensor 208 and 14-18 mm from filter 206*a*. As another example, a surface of filter 206*b* may be between 5-8 times closer to sensor 208 than to filter 206*a* (e.g., at least 6 times closer, at least 7 times closer, etc.). In other use cases, however, a surface of filter 206*b* may be farther from sensor 208 than from filter 206*a*. In another use case, a surface of filter 206*a* may be closer to a fiber optic cable (from which light is emitted toward filter 206*a*) than to filter 206*b*.

Figure 3B:
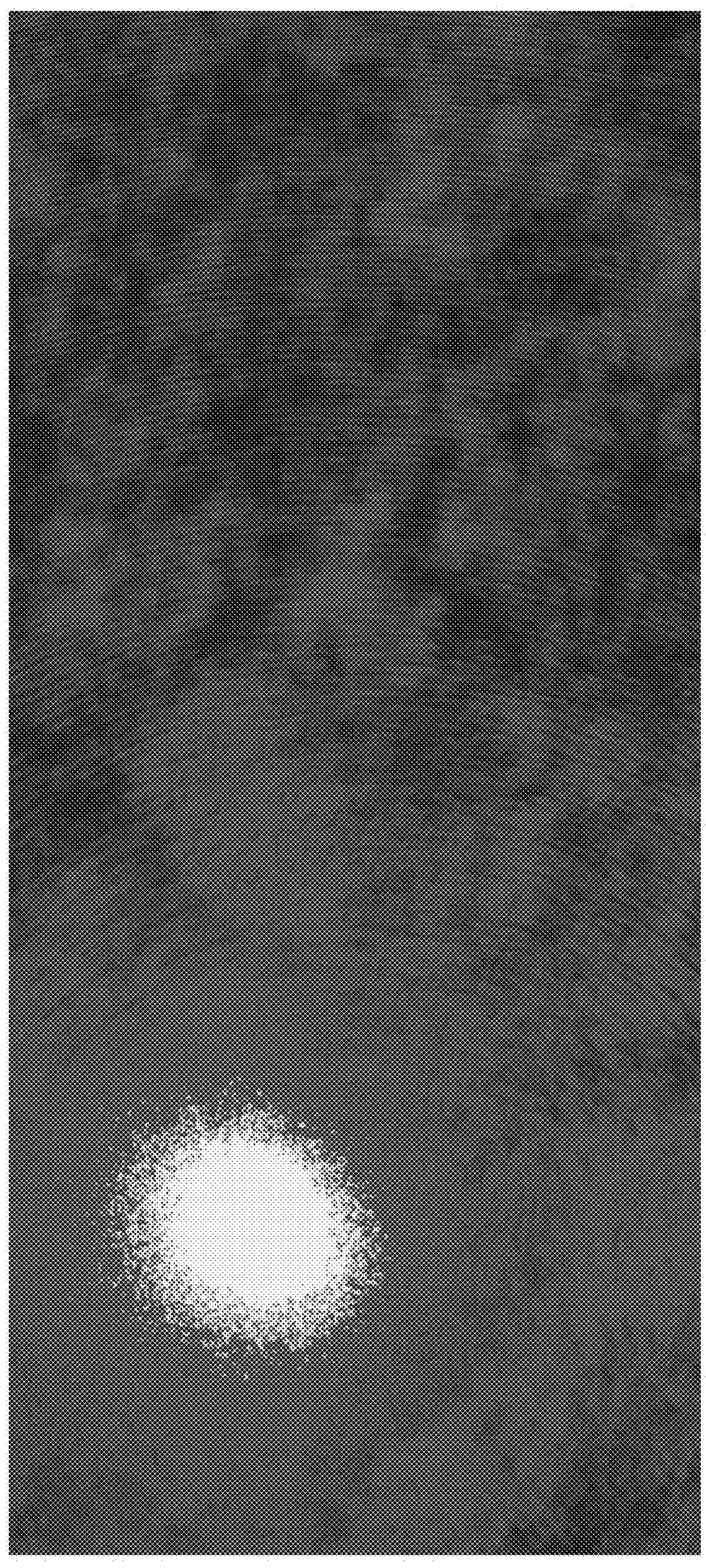
FIG. 3B shows an example of an image of filtered light that has a circular pattern introduced by one or more filters, in accordance with one or more embodiments.

In some embodiments, detection subsystem 112 may detect one or more activities based on a focal point, background, or other portion of a filter light. As an example, the shape, coloration, and shading/contrast of the pattern changes based on the intensity of the laser source. Manipulation of the fiber optic cable results in reflections and refractions of the laser light that create two potential phenomena: the shape, coloration, and composition of the focal point can change. Significant bends and stretches produce the most dramatic changes that indicate significant manipulation of the cable. The shape, coloration, and composition of the background pattern can change based on the type of manipulation to the cable. In one scenario, the circular pattern shown in FIG. 3B can disappear temporarily based on movement of the cable. The coloration and composition can also be significantly altered.

In some embodiments, detection subsystem 112 may determine one or more reference coordinates for one or more boundaries related to filtered light (e.g., within an image or otherwise represented by sensor data) and determine one or more activities related to the filtered light (or subsequent filtered light) based on the reference coordinates. As an example, detection subsystem 112 may determine and store one or more first reference coordinates for a first boundary (e.g., around the focal point), second reference coordinates for a second boundary (e.g., larger than the first boundary, that is farther from a center of the focal point than the first boundary, etc.), third reference coordinates for a third boundary (e.g., larger than the second boundary, that is farther from the center of the focal point than the second boundary, etc.), and so on. After storing the reference coordinates (e.g., in memory, in one or more databases, etc.), detection subsystem 112 may retrieve the stored reference coordinates and determine one or more activities related to subsequent filtered light based on the stored reference coordinates.

As another example, the boundaries may be determined based on one or more distance, color, intensity, or other thresholds. In one use case, after the focal point is detected (e.g., based on the focal point location on an image being of high color contrast, high intensity, etc., compared to the background), the first boundary may be determined based on one or more color, intensity, distance, or other thresholds, such as (i) points of the first boundary being or within a first threshold distance from a center of the focal point colors or from determined edges of the focal point, (ii) colors at points of the first boundary being within a first color contrast threshold from a color of the center of the focal point or from colors of the determined edges of the focal point, (iii) intensities of the points of the first boundary being within a first intensity contrast threshold from a light intensity of the center of the focal point or from intensities of the determined edges of the focal point, or (iv) combinations thereof. In a further use case, the first boundary may be determined based on (i) colors at the points of the first boundary being within the first color contrast threshold from the color of the center of the focal point or from the determined edges of the focal point, (ii) the points of the first boundary being at least the first distance threshold from the center of the focal point or from the determined edges of the focal point, and (iii) the points of the first boundary being within another distance threshold (greater than the first distance threshold) from the center of the focal point or from the determined edges of the focal point.

In another user case, the second boundary may be determined based on one or more second color, intensity, distance, or other thresholds, such as (i) points of the second boundary being or within a second threshold distance (e.g., different than the first threshold distance) from a center of the focal point colors, from the determined edges of the focal point, or from the edges of the first boundary, (ii) colors at points of the second boundary being within a second color contrast threshold (e.g., different from the first color contrast threshold) from the color of the center of the focal point, from colors of the determined edges of the focal point, or from colors of the edges of the first boundary, (iii) intensities of the points of the first boundary being within a second intensity contrast threshold (e.g., different from the first intensity contrast threshold) from the intensity of the center of the focal point, from intensities of the determined edges of the focal point, or from the intensities of the edges of the first boundary, or (iv) combinations thereof.

Figures 4A, 4B:
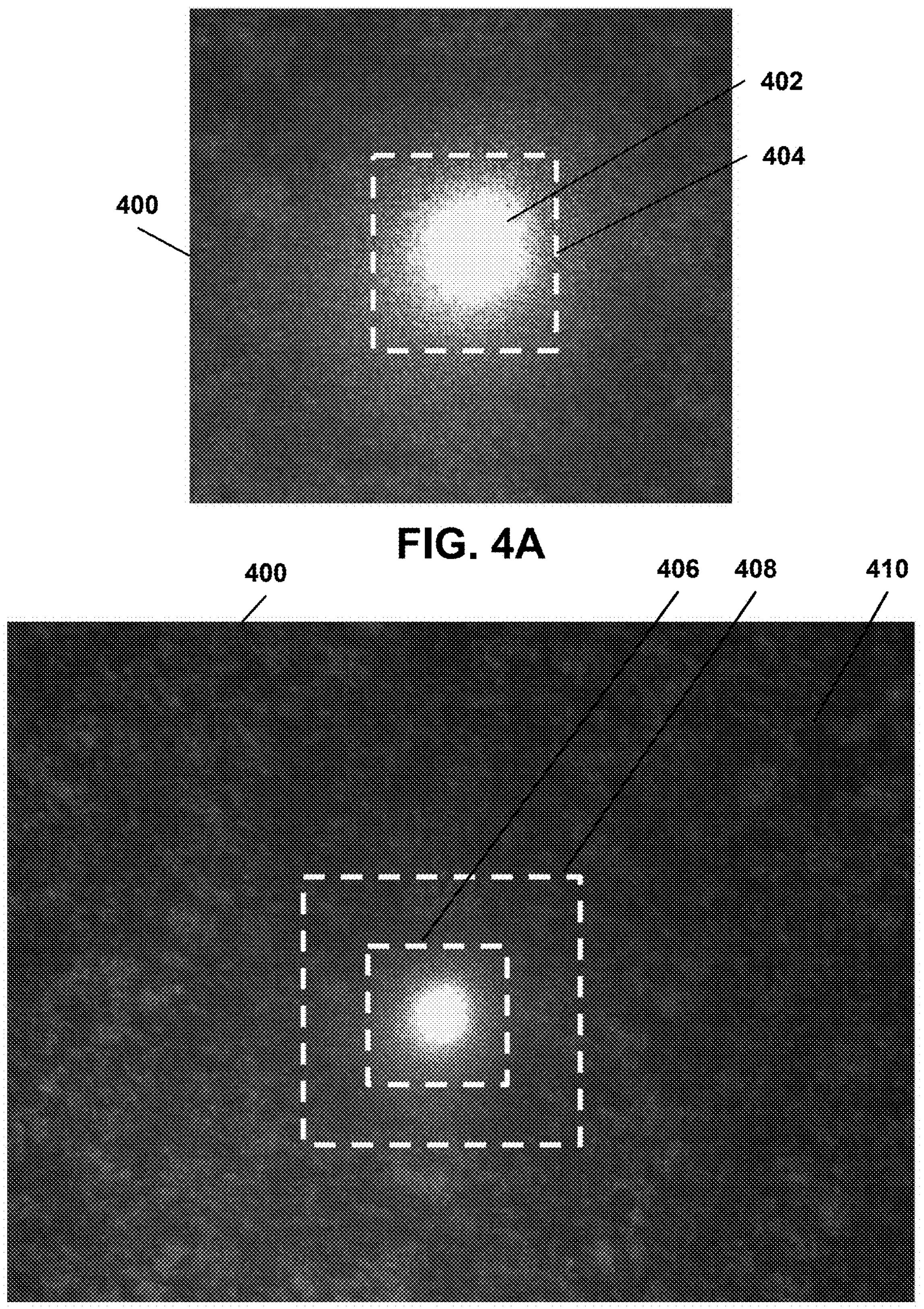
FIGS. 4A-4B show examples of an image of filtered light and one or more boundaries for processing filtered light images, in accordance with one or more embodiments.

In one use case, as shown in FIG. 4A, as a result of filters discussed herein, focal point 402 is a high contrasting color (e.g., compared to the background) of image 400, thereby making it easier for a detection algorithm or model (e.g., as part of detection subsystem 112) to determine the edges of focal point 402. Once focal point 402 has been located, the detection algorithm or model may store the coordinates for this boundary 404 of focal point 402.

In another use case, as shown in FIG. 4B, the detection algorithm or model may determine a boundary 406 around the focal point (e.g., that includes more of the background than the boundary shown in FIG. 4A) and store the coordinates for this boundary 406 of focal point 402. In a further use case, the detection algorithm or model may establish an "outer" second boundary 408 (e.g., around the "focal point" boundary 406 within which a larger subset of the background or "sub-background" is located) and store the coordinates for the second boundary 408. As indicated herein, the coordinates for one or both boundaries may be subsequently used to enable more efficient monitoring/detection of the focal point 402 or background pattern 410 in subsequent images or subsequently captured sensor data (e.g., to locate the focal point 402, to monitor for one or more activities while processing a reduced dataset, etc.). For example, data related to the boundaries may be monitored for one or more activities (e.g., an intrusion event or other activity) without requiring the extraction or subsequent processing of data extracted from the remainder of the background, thereby reducing computation resource usage (and, thus, increasing the efficiency of the system). Additionally, or alternatively, in scenarios involving the use of one or more translucent filters (e.g., where the light may be overly diffused), limiting the data to the second boundary (or another subset of the background) may reduce the use of data that overly exaggerates or obfuscates changes occurring in the unfiltered light (e.g., for training or configuring a prediction model or as input to the prediction model to obtain predictions), thereby increasing accuracy of predictions.

In some embodiments, data conversion subsystem 114 may generate datasets based on subsequent filtered light and reference coordinates for one or more boundaries, and detection subsystem 112 may determine one or more activities via a prediction model based on the generated datasets. In some embodiments, data conversion subsystem 114 may generate (i) a first dataset based on the subsequent filtered light and first reference coordinates for a first boundary (e.g., around the focal point), (ii) a second dataset based on the subsequent filtered light and second reference coordinates for a second boundary (e.g., larger than the first boundary, that is farther from a center of the focal point than the first boundary, etc.), or (iii) other datasets based on the subsequent filtered light and other reference coordinates for one or more other boundaries. As an example, the first dataset may include first color composition data corresponding to the first boundary, and the second dataset may include second color composition data corresponding to the second boundary.

In some embodiments, as discussed above, data conversion subsystem 114 may generate (i) a first dataset based on the subsequent filtered light and first reference coordinates for a first boundary, (ii) a second dataset based on the subsequent filtered light and second reference coordinates for a second boundary, or (iii) other datasets based on the subsequent filtered light and other reference coordinates for one or more other boundaries. Model subsystem 116 may input the datasets into a prediction model (e.g., an anomaly detection model or other prediction model) to obtain one or more predictions, which may be used to detect one or more activities (e.g., an intrusion event or other adverse event).

In some embodiments, the first dataset may indicate one or more amounts of a first color or locations of the first color within the first boundary, one or more amounts of a second color or locations of the second color within the first boundary, an extent of or locations of lack of the first color and the second color within the first boundary, or other data. The second dataset may include one or more amounts of the first color or locations of the first color within the second boundary, one or more amounts of the second color or locations of the second color within the second boundary, an extent of or locations of lack of the first color and the second color within the second boundary, or other data. As another example, the first color may correspond to the focal point (e.g., a color determined to be the focal point color, a color assigned in a database to be the focal point color, etc.), and the second color may correspond to scatter light (e.g., red light, blue light, green light, a color corresponding to the laser scatter light, etc.) in the subsequent filtered light.

Figure 5A:
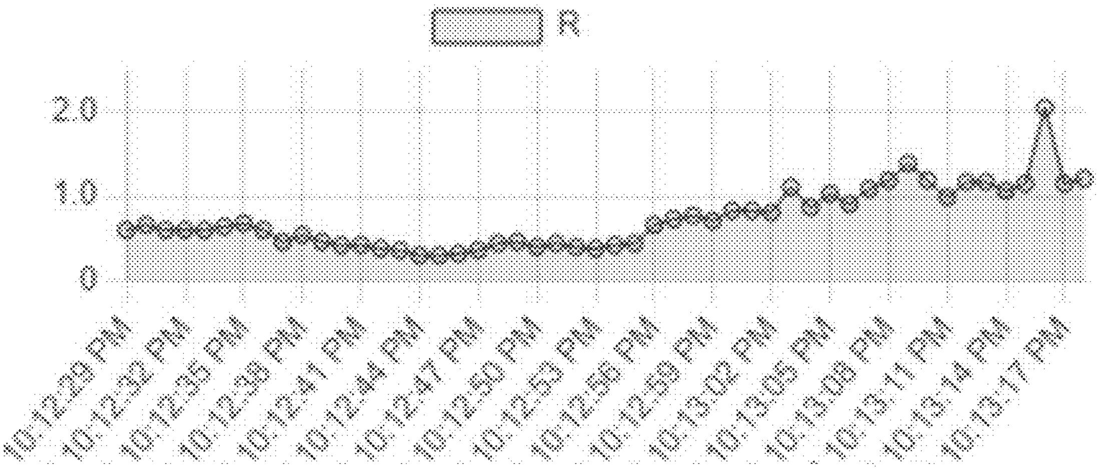
FIGS. 5A-5C show examples of time-series datasets of a laser scatter signal, a laser focal point signals, and a "No Laser" signal detected within first and second boundaries, in accordance with one or more embodiments.
Figure 5A:
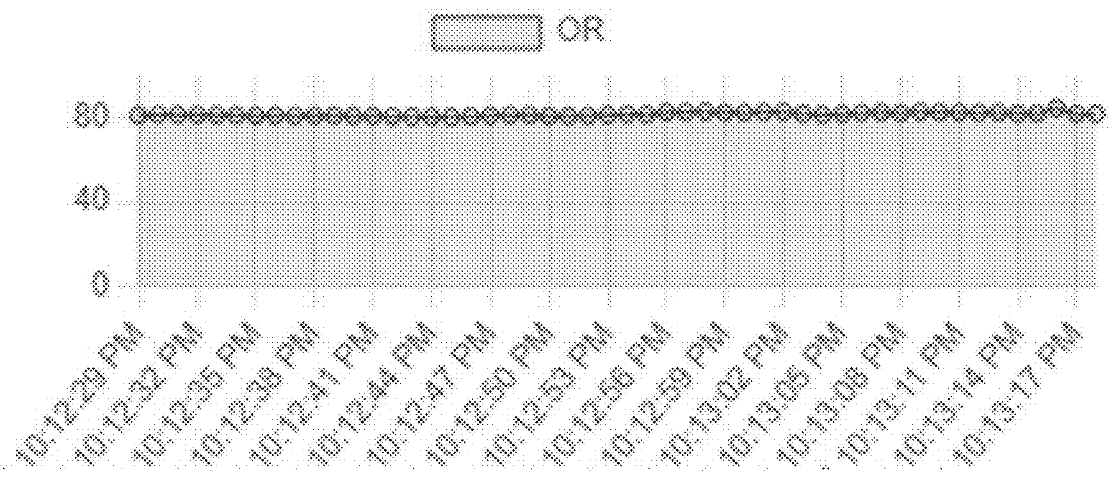
Figure 5B:
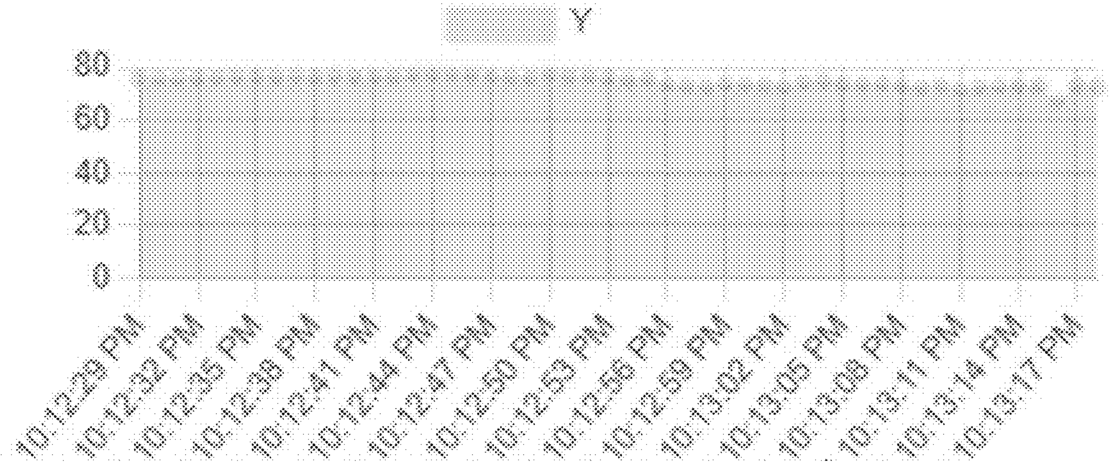
Figure 5B:
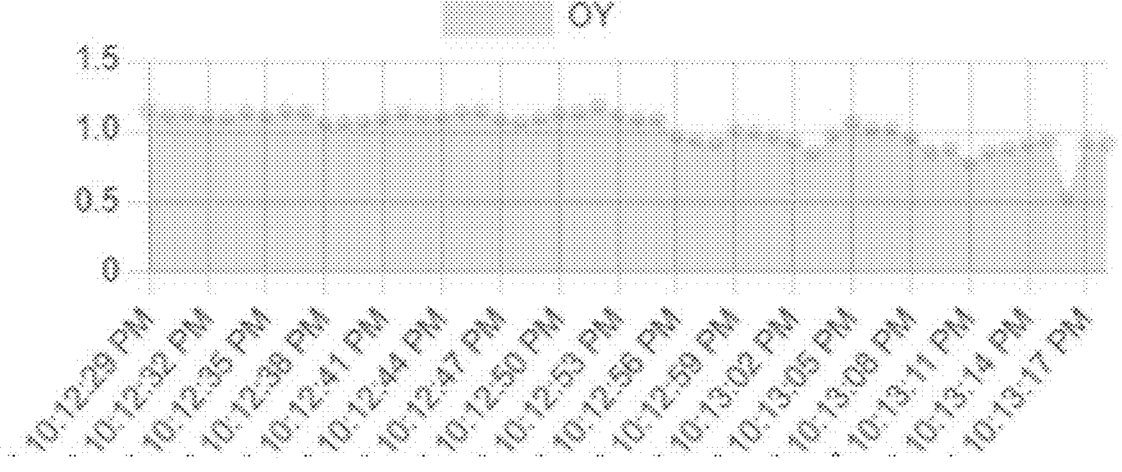
Figure 5C:
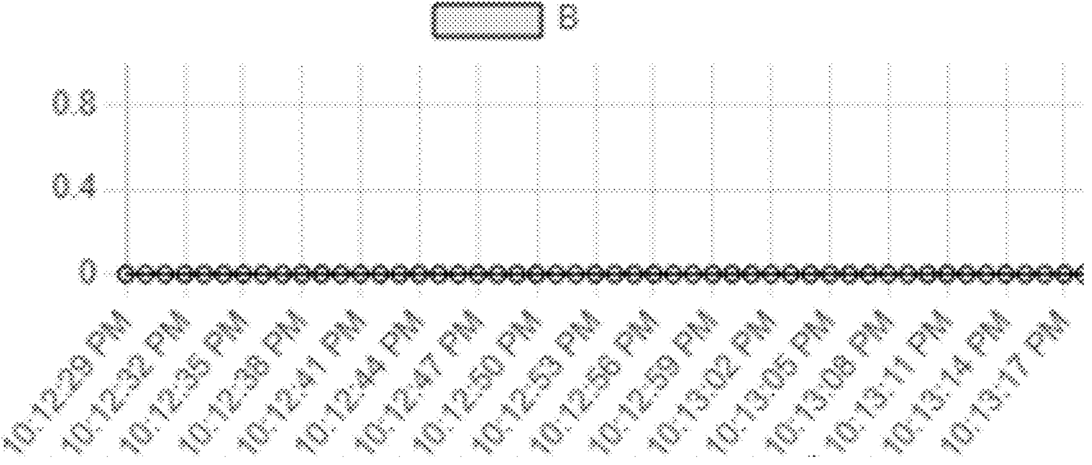
Figure 5C:
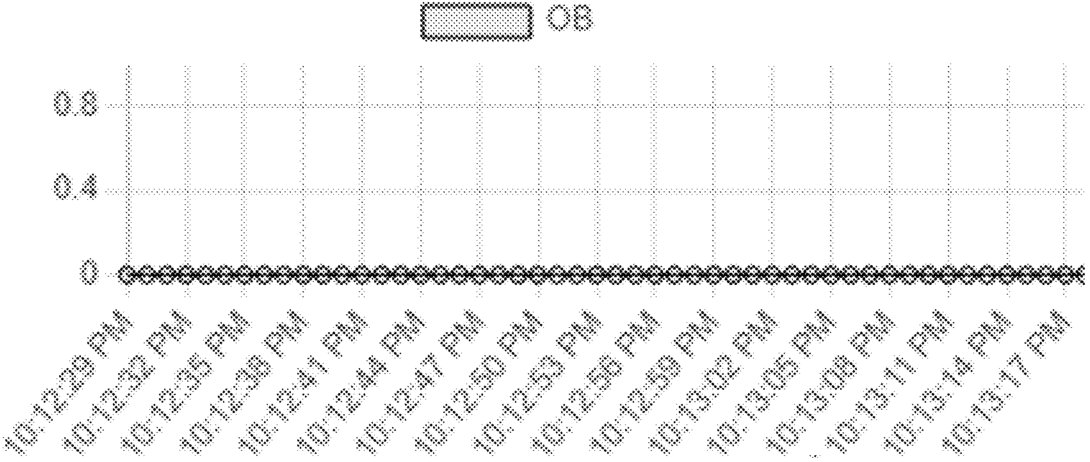
Figure 6A:
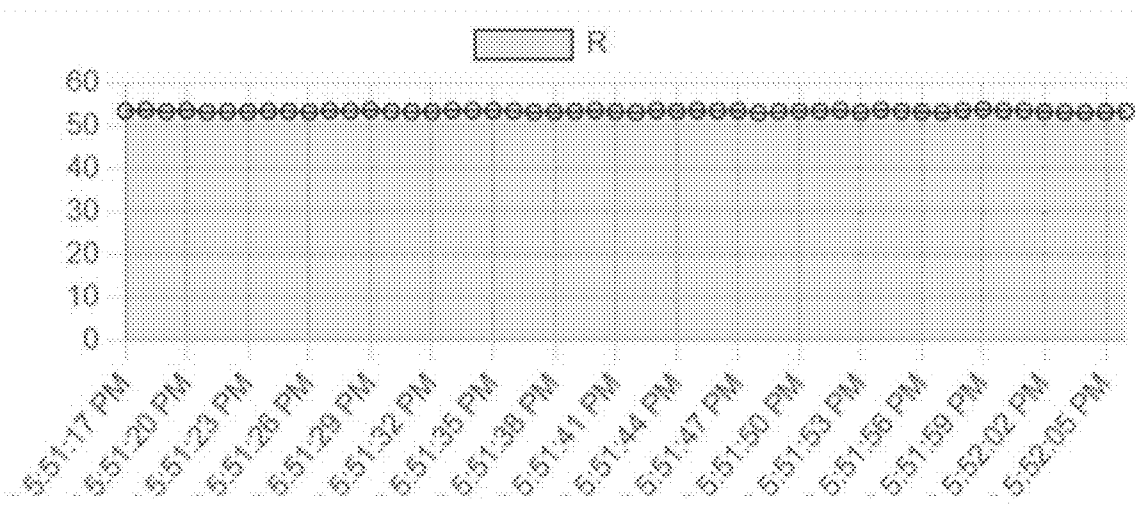
FIGS. 6A-6C show examples of time-series datasets of a laser scatter signal, a laser focal point signals, and a "No Laser" signal detected within first and second boundaries during normal/stable operation, in accordance with one or more embodiments.
Figure 6A:
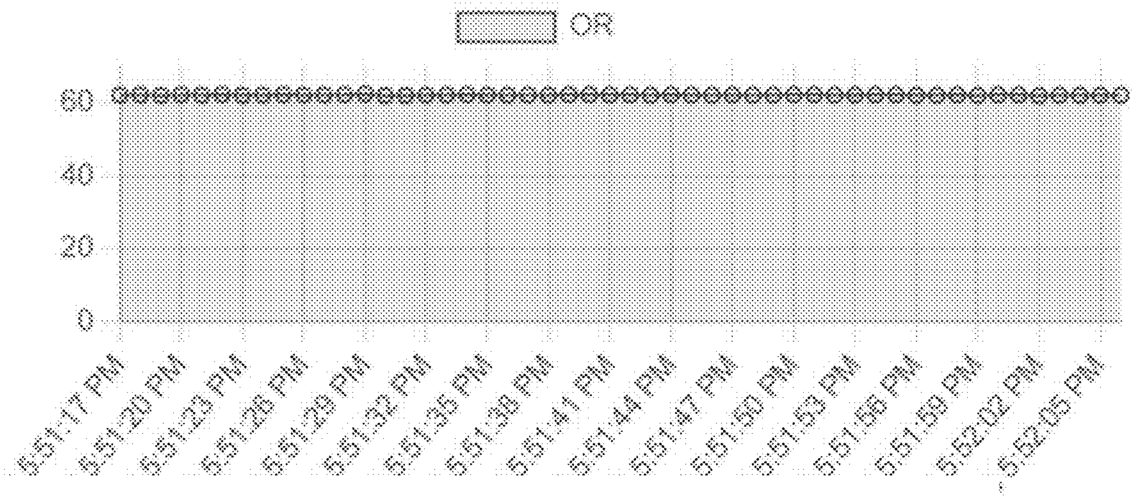
Figure 6B:
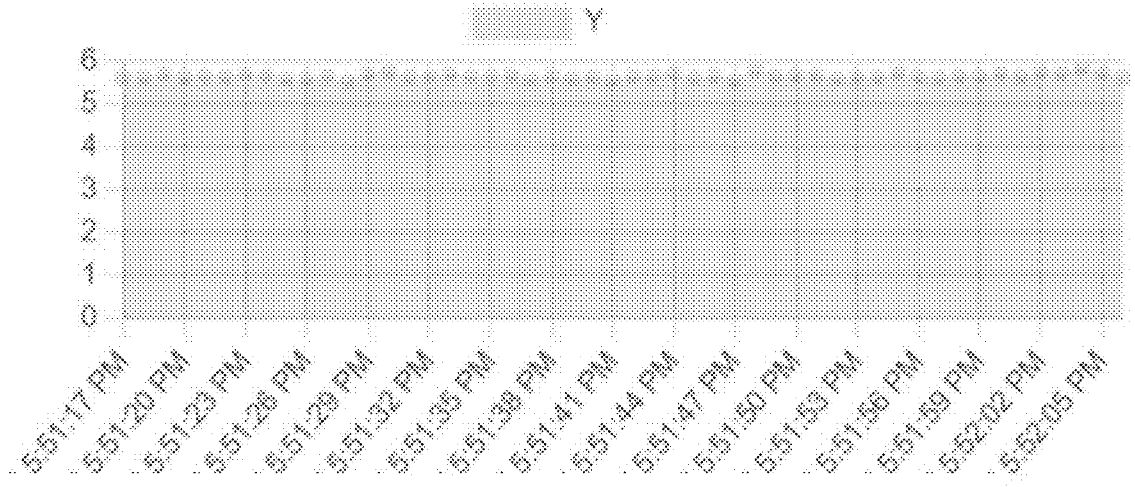
Figure 6B:
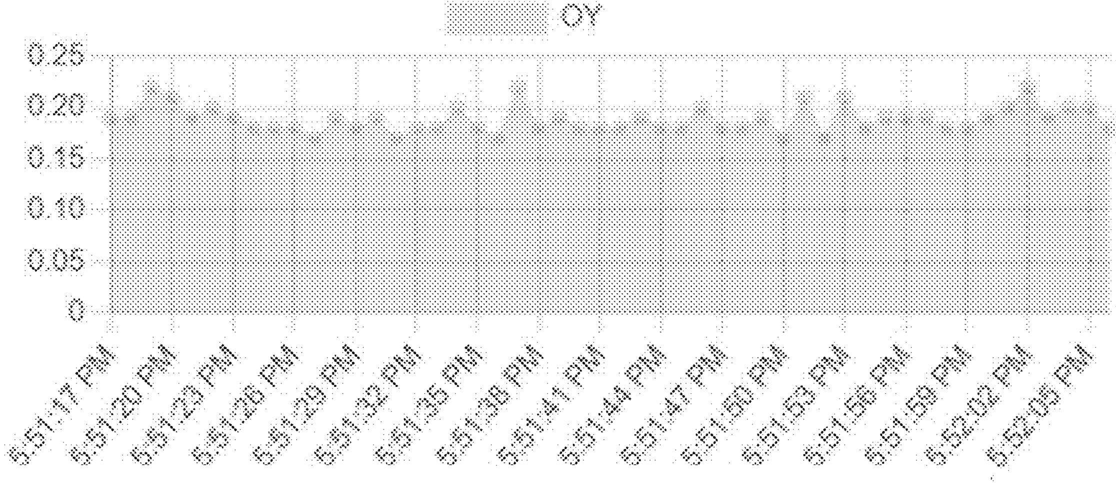
Figure 6C:
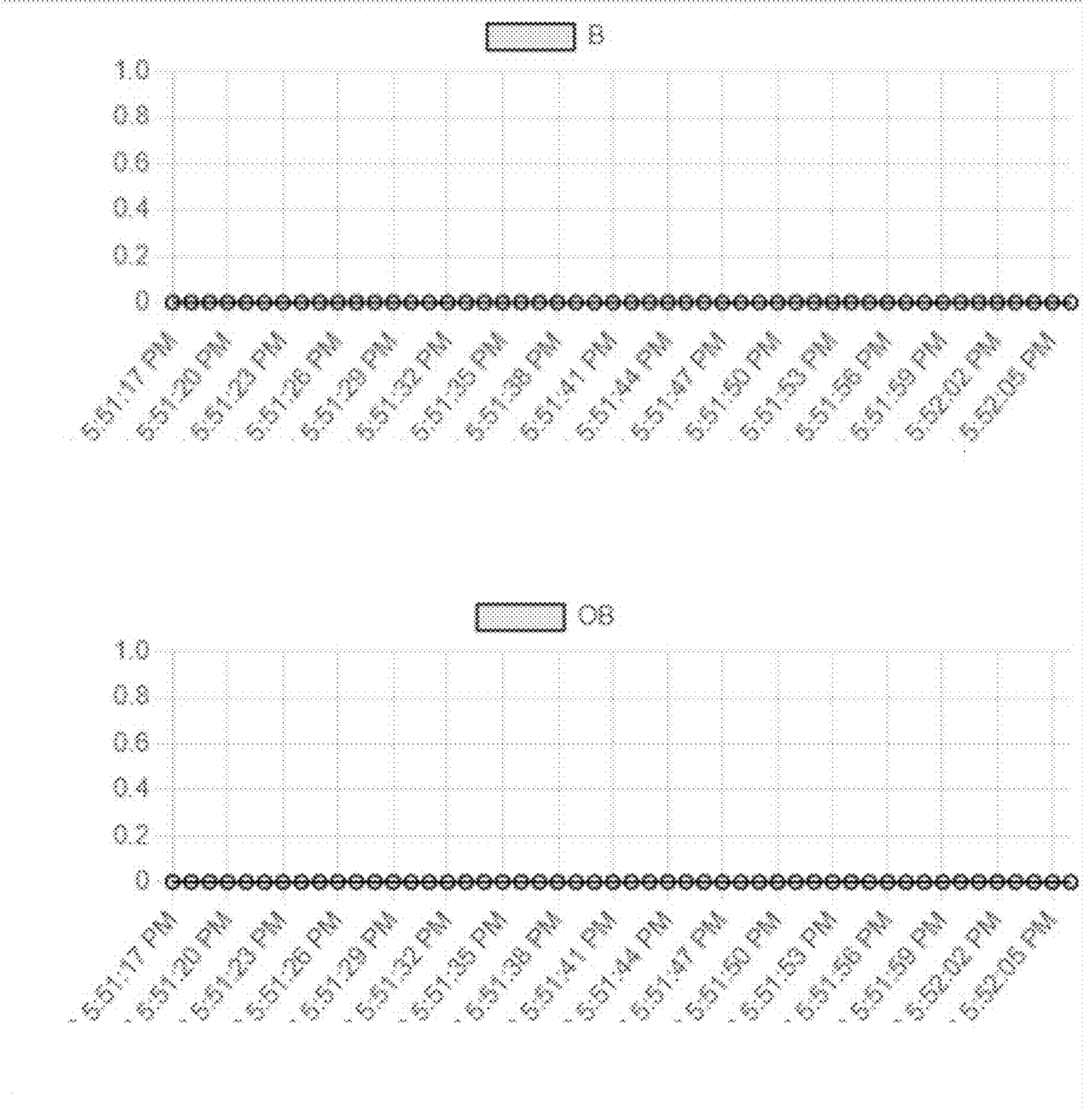

In some embodiments, such datasets may include one or more time-series datasets. In one scenario, with respect to FIGS. 4A-4B, 5A-5C, 6A-6C, 7A-7C, 8A-8C, and 9A-9C, once the focal point 402 has been detected (and its related coordinates are determined), subsequent captures are taken, and the coordinates for both the first boundary and the second boundary are used to quickly search the subsequent captures and determine the composition of color groups within both. As an example, each boundary's composition may be split into three different signals: (i) a laser scatter signal representing changes to laser color; a laser focal point signal representing changes to the focal point color; and a "No Laser" signal representing the lack of any laser or focal point color. FIGS. 5A-5C show an example of readings from each signal for both the first and second boundaries over time. Variations in these signals can represent physical changes to the optical cable or laser source. For example, with respect to FIGS. 6A-6C, when the laser source is inactive or offline, the No Laser signal would report a high value, indicating an image that is completely or mostly black. FIGS. 6A-6C show an example of readings indicating a loss of signal (e.g., the increase in both the "no laser" signal values and corresponding decreases in all other signal types), which may be detected as a high likelihood of a signal loss or fiber cut incident (e.g., depending on one or more other readings).

Figure 7A:
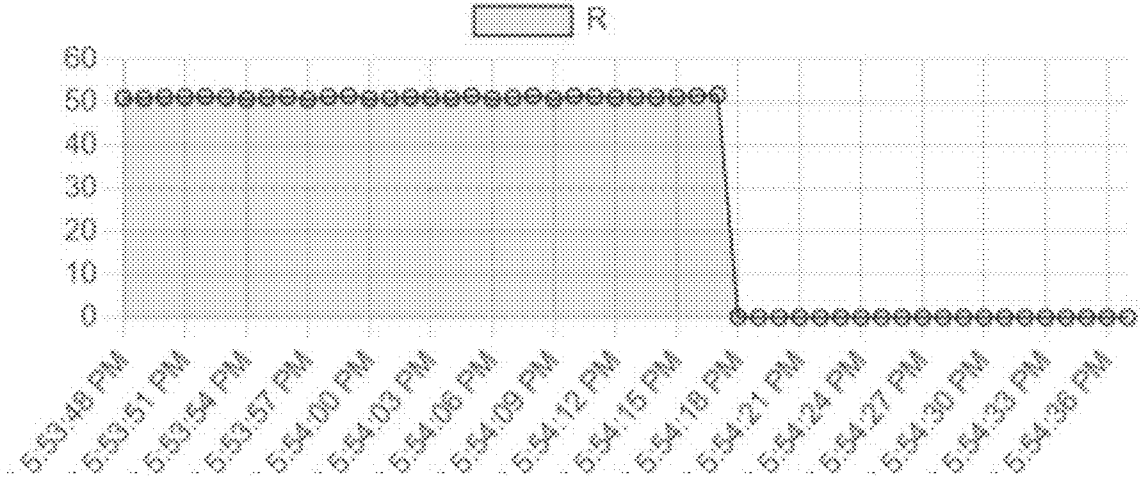
FIGS. 7A-7C show examples of time-series datasets of a laser scatter signal, a laser focal point signals, and a "No Laser" signal detected within first and second boundaries that occur in a time period during which the laser source becomes inactive or goes offline, in accordance with one or more embodiments.
Figure 7A:
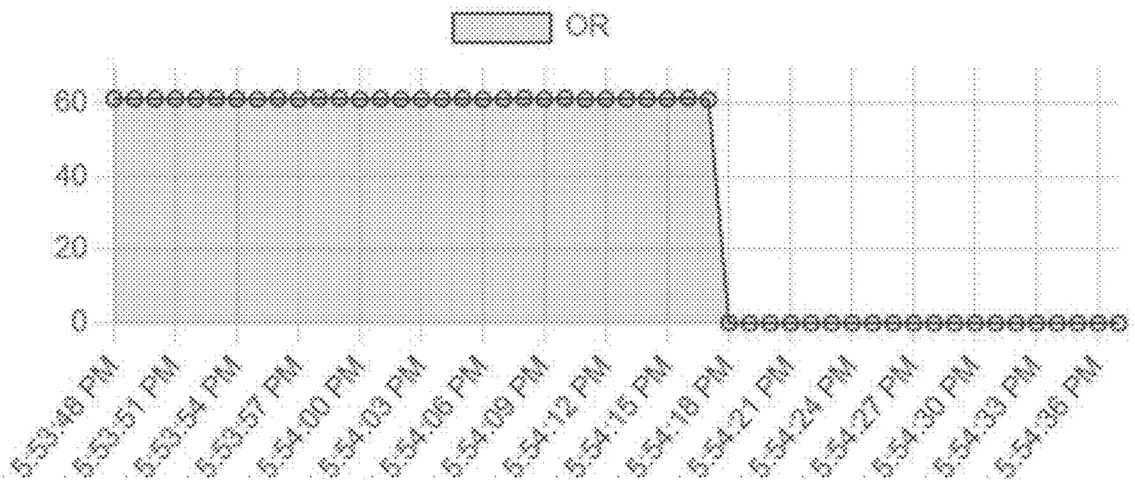
Figure 7B:
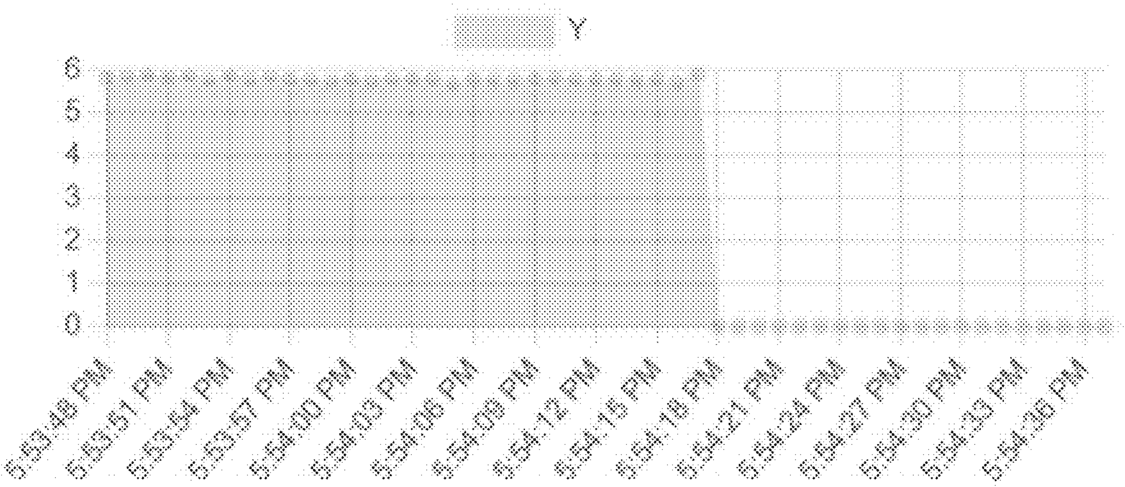
Figure 7B:
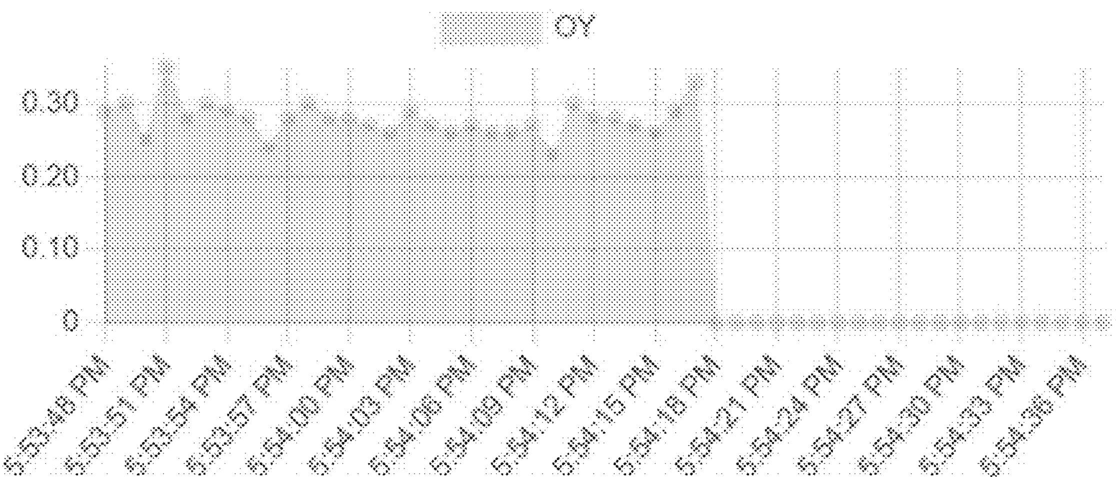
Figure 7C:
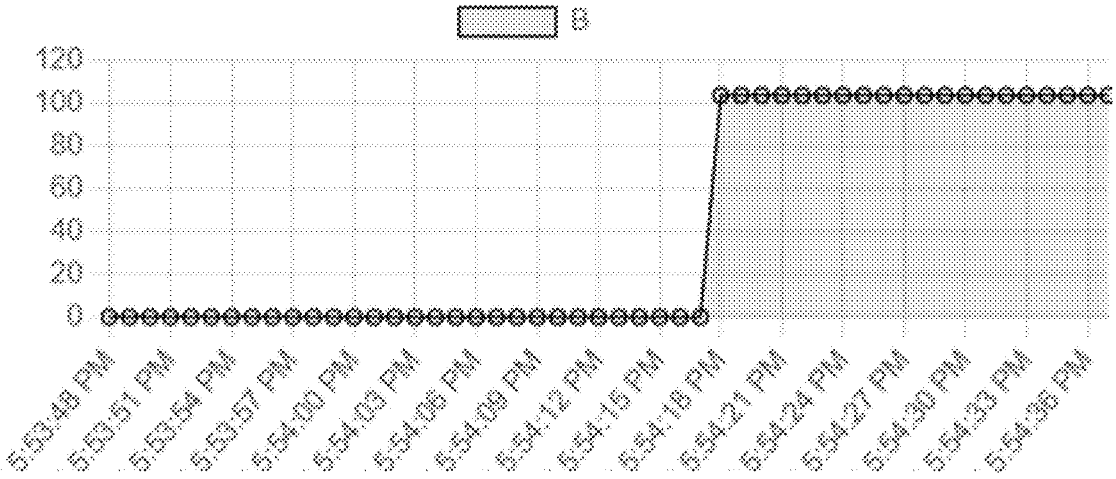
Figure 7C:
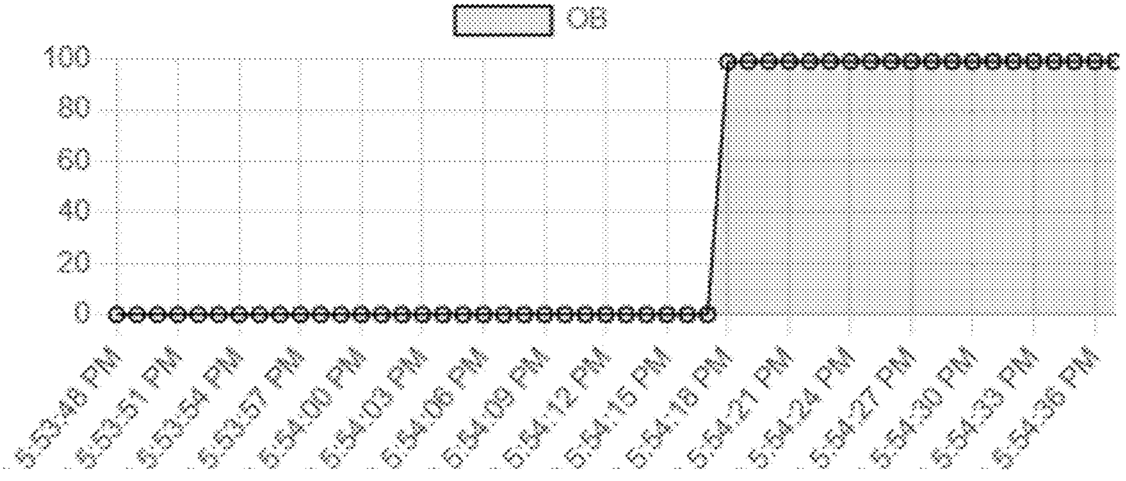
Figure 8A:
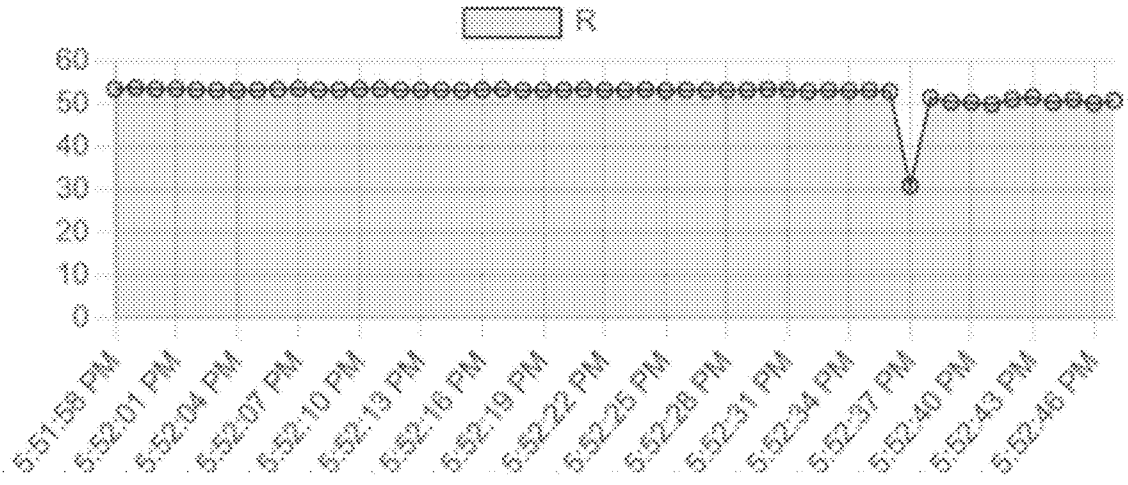
FIGS. 8A-8C show examples of time-series datasets of a laser scatter signal, a laser focal point signals, and a "No Laser" signal detected within first and second boundaries that occur in a first time period during which a cable is moved, in accordance with one or more embodiments.
Figure 8A:
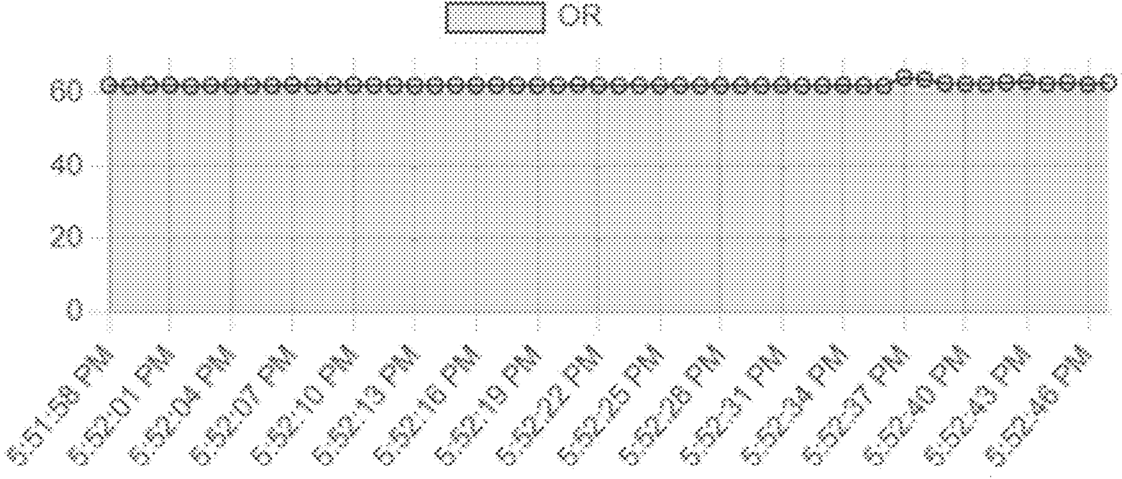
Figure 8B:
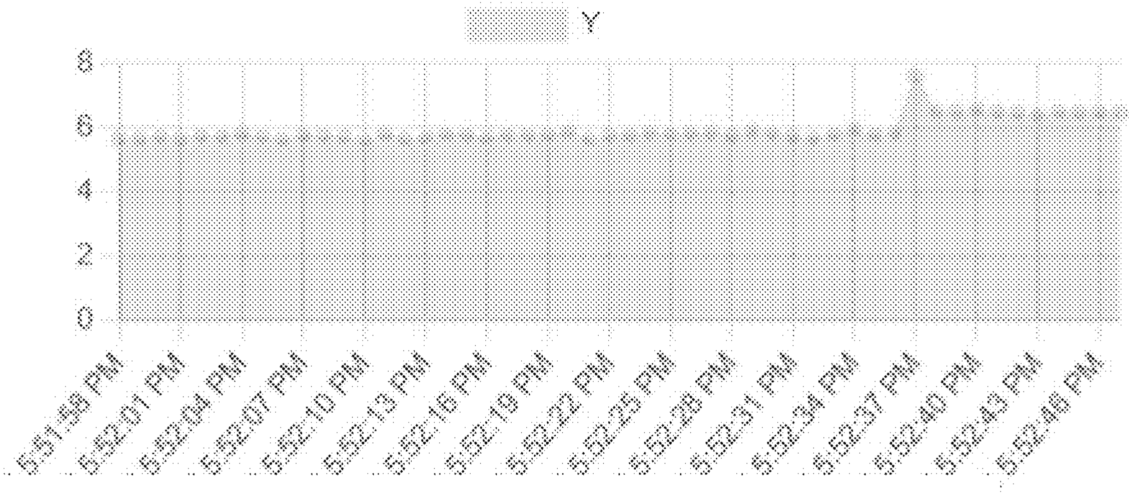
Figure 8B:
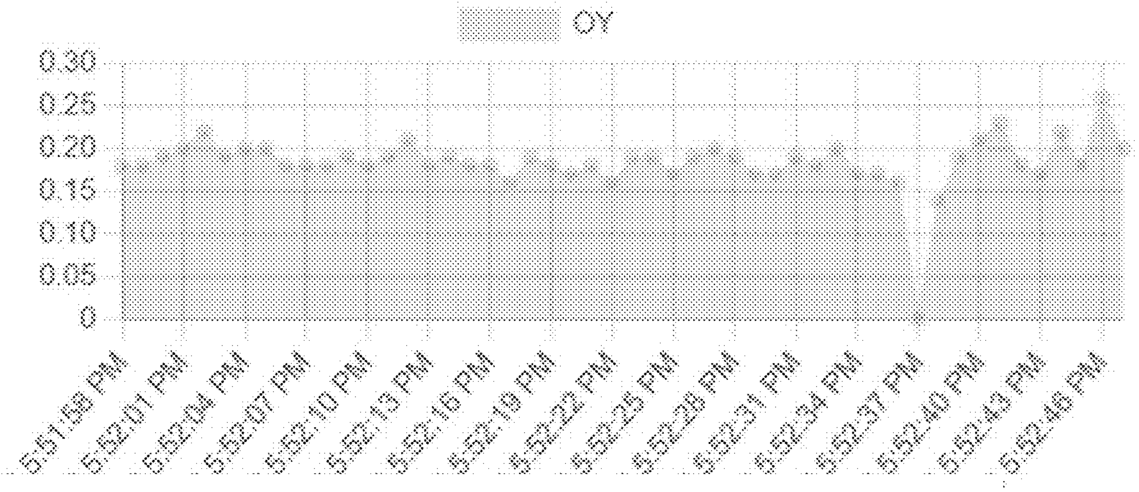
Figure 8C:
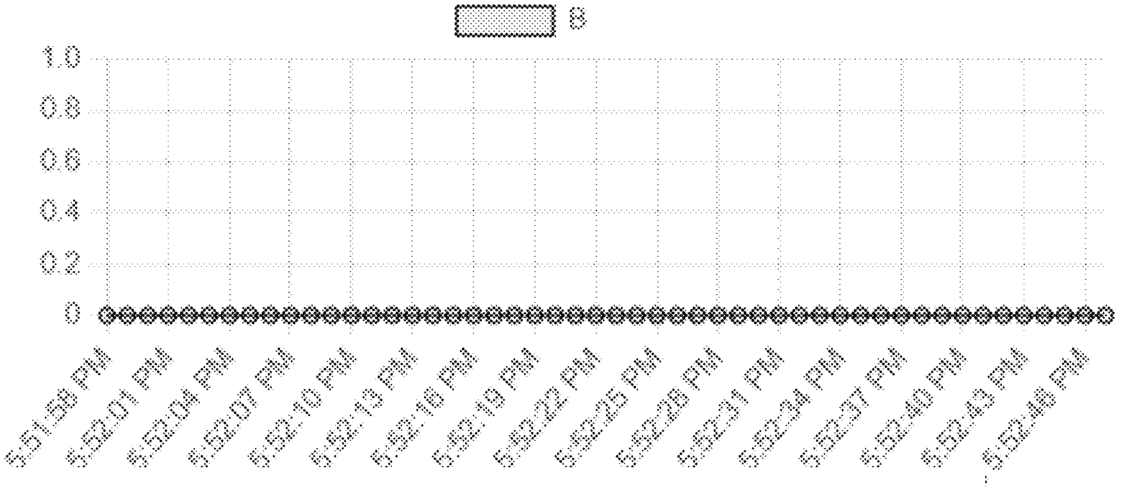
Figure 8C:
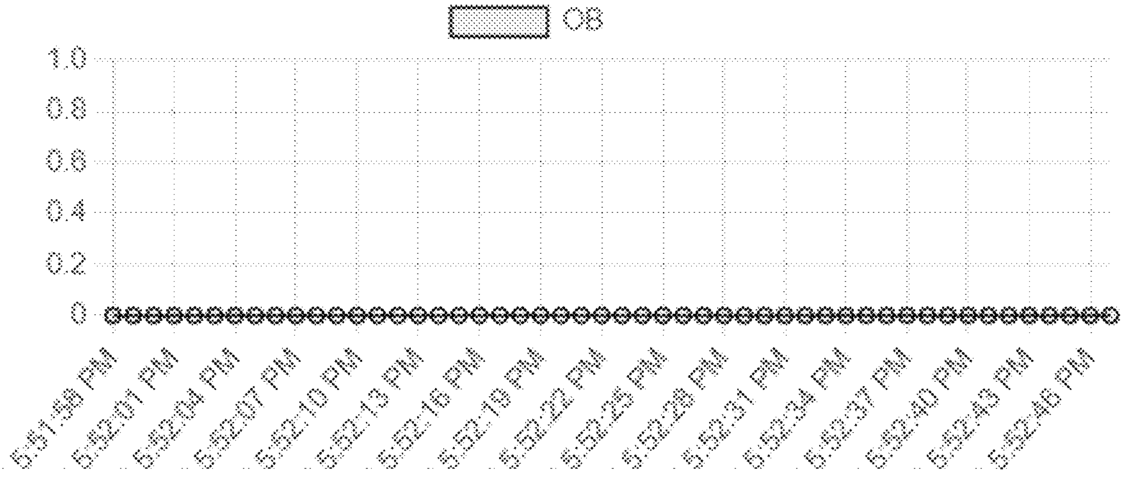
Figure 9A:
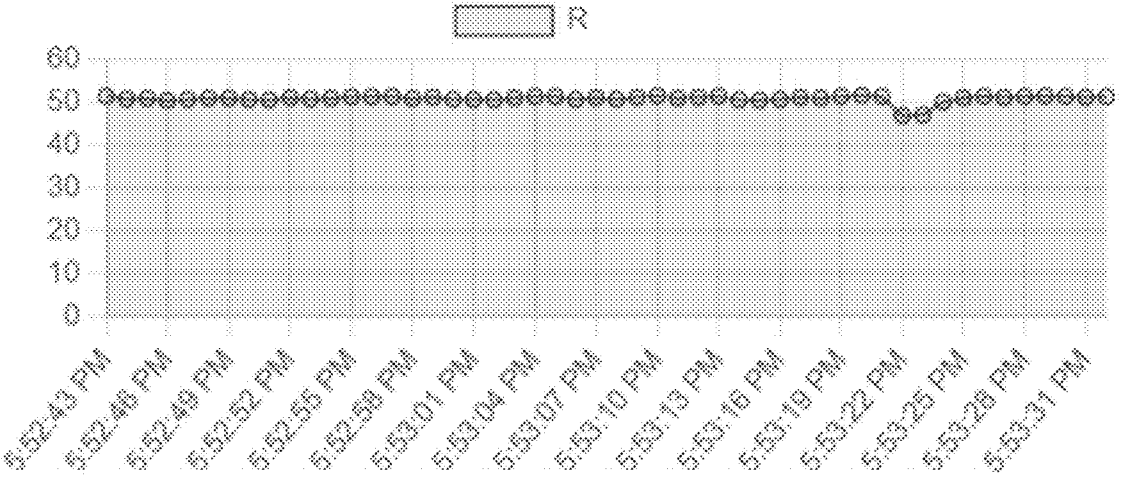
FIGS. 9A-9C show examples of time-series datasets of a laser scatter signal, a laser focal point signals, and a "No Laser" signal detected within first and second boundaries that occur in a second time period during which a cable is moved, in accordance with one or more embodiments.
Figure 9A:
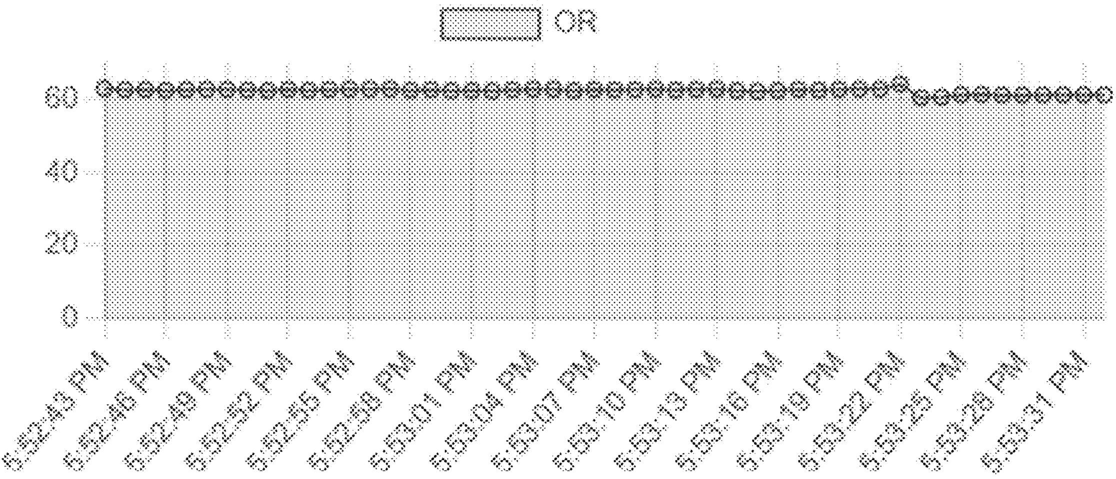
Figure 9B:
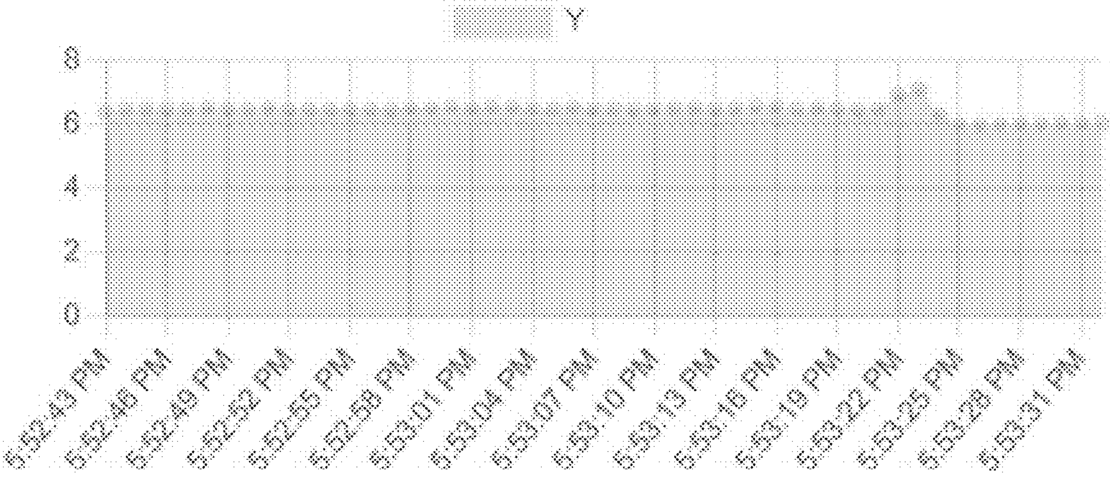
Figure 9B:
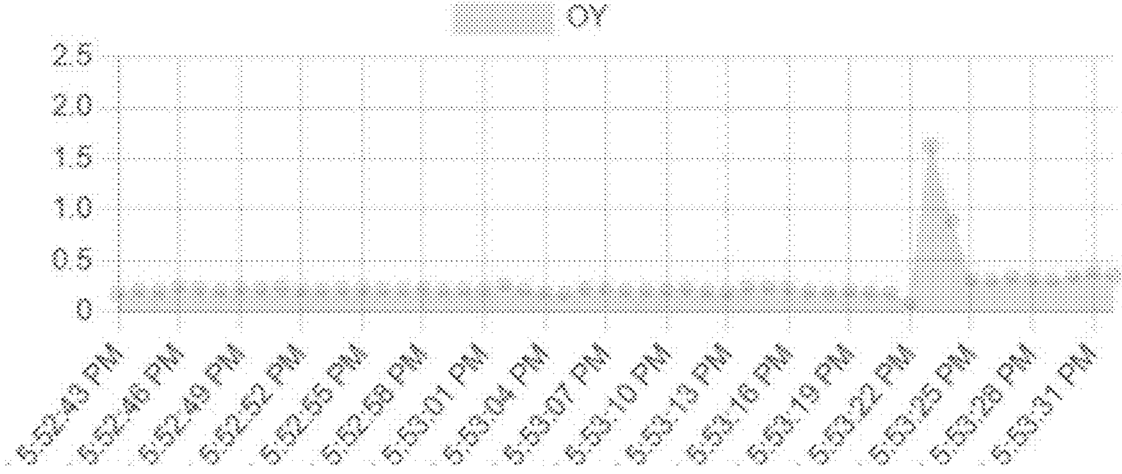
Figure 9C:
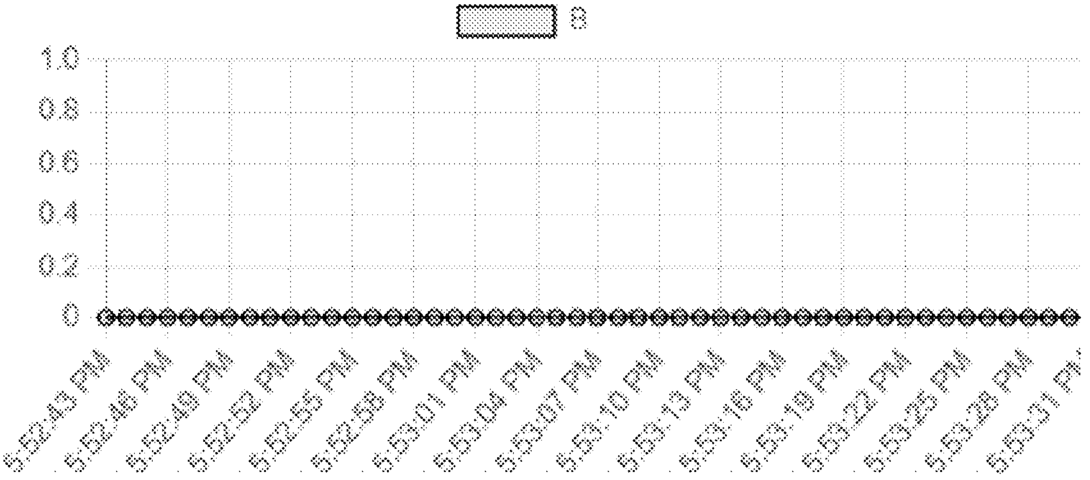
Figure 9C:
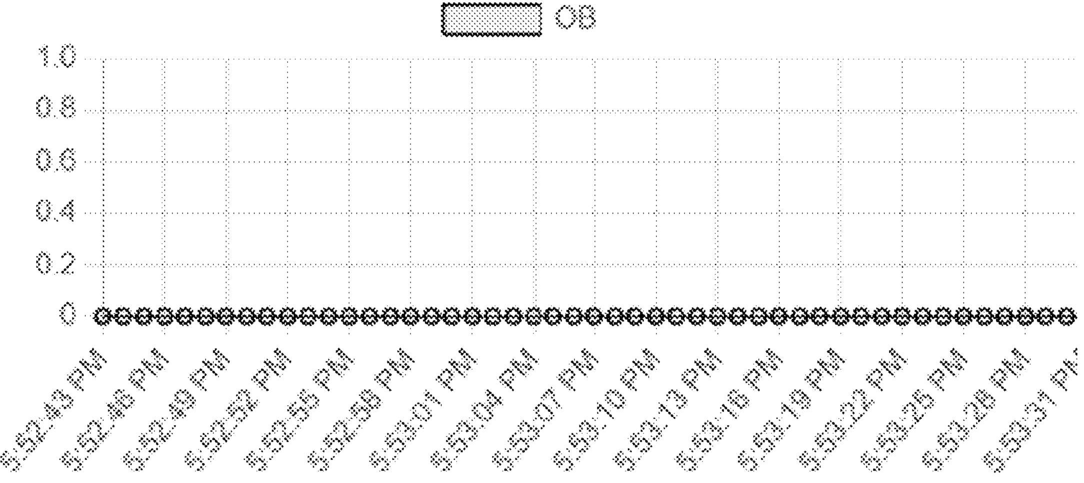

As another example, with respect to FIG. 7A-7C, under normal or stable operation, signal fluctuation is minimal, and the "No Laser" and laser scatter signals remain at a nearly constant value. However, when a disturbance occurs against the cable, there is an observable and measurable variation in the signals. FIGS. 8A-8C and 9A-9C, for example, show the signal changes when the cable is moved. Any single or combination of these signals can be used to provide event information to upstream monitoring systems. In some embodiments, one or more change thresholds or other configurations may be used to determine when events should be forwarded upstream or to change the definition of an "event" that should be forwarded.

In some embodiments, model subsystem 116 may train or configure one or more detection or other prediction models to facilitate one or more embodiments described herein. In some embodiments (including where one or more cameras are used to capture images of light or filtered light, e.g., from a fiber optic cable), machine learning techniques generally used for image classification may be used in one or more embodiments to detect patterns and variations in a light signal (e.g., the filtered light signal). In some embodiments, the prediction models may include supervised or unsupervised machine learning models. In some embodiments, the prediction models may include reinforced learning models (e.g., continuously updated via a continuous learning process). As an example, model subsystem 116 may facilitate a feedback loop process that provides options for the upstream system or user to provide classification information (e.g., labels) that can be used by model subsystem 116 to better classify events in the future or add support for new event types.

In some embodiments, the prediction models may include one or more neural networks. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 10:
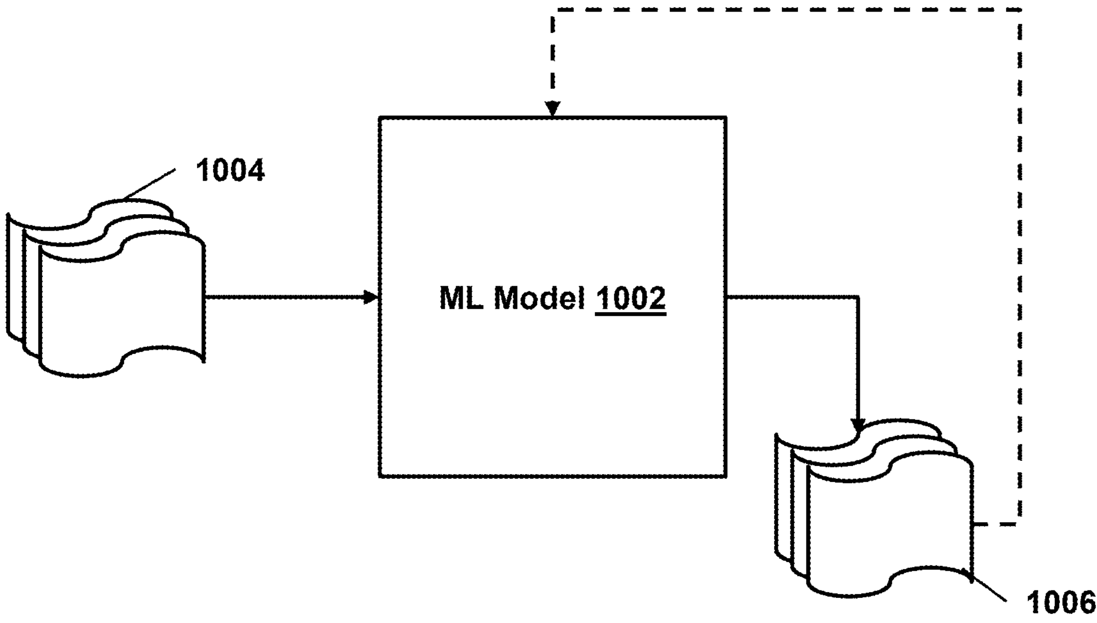
FIG. 10 shows a machine learning model configured to facilitate activity detection, in accordance with one or more embodiments.

As an example, with respect to FIG. 10, machine learning model 1002 may take inputs 1004 and provide outputs 1006. In one use case, outputs 1006 may be fed back to machine learning model 1002 as input to train machine learning model 1002 (e.g., alone or in conjunction with user indications of the accuracy of outputs 1006, with labels associated with the inputs, or with other reference feedback information). In another use case, machine learning model 1002 may update its configurations (e.g., weights, biases, or other parameters) based on its assessment of its prediction (e.g., outputs 1006) and reference feedback information (e.g., user indication of accuracy, reference labels, or other information). In another use case, where machine learning model 1002 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 1002 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bidirectional structure, forward and backward connections may be provided. The links are also referred to as connections or connection weights, as referring to the hardware-implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some embodiments, model subsystem 116 may associate events (or other activities) to specific times and based on user-initiated options, can observe/record these events over a defined time period (e.g., X hours, X days, X weeks, etc.) and automatically adjust the thresholds before generating and sending alerts or other event notifications to one or more administrators or other users. In some embodiments, the types of signals that are monitored may be adjusted. As an example, model subsystem 116 may modify one or more "tuning" parameters (e.g., via user input or without any user input specifying the particular modification). Some examples of such modifications include: modifying which signals are included in determining the definition of an "event," modifying the degree of change for each signal, modifying the weight of degree of change for each signal, modifying the number of concurrent signals changes in X time that constitute an event, or other modifications. In one use case, as indicated by FIGS. 8A-8B and 9A-9B, the "Focal Point—Laser Scatter Signal" and the "Outer Section Laser Signal" show the largest degree of change when a cable is handled. However, the signals that are to be included in event detection could be modified by the user. In another use case, one or more change thresholds can be used to adjust the value at which a signal is determined to have changed a significant amount. In another use case, weighting of the degree of change could be modified to reduce the impact of one or more signals over another. As another use case, two or more signal changes within one second may be classified as an event sent to the user or upstream system.

In some embodiments, model subsystem 116 may train a machine learning model based on a training dataset of images or other light-derived data (e.g., filtered light emitted via a physical transmission line) to generate predictions related to one or more activities. As an example, the machine learning may be provided with an input (e.g., representation of an image of filtered light or other image data) and generate the predictions as an output. As a further example, each input may include a first subset of the filtered light (e.g., a vector representation of the first subset extracted based on predetermined reference coordinates for a first focal-point-related boundary), a second subset of the filtered light (e.g., a vector representation of the second subset extracted based on predetermined reference coordinates for a second boundary around the first boundary), a third subset of the filtered light (e.g., a vector representation of the third subset extracted based on predetermined reference coordinates for a third boundary around the second boundary), and so on. In one use case, each input may be associated with a label (e.g., intrusion, cable movement, signal loss, normal activity, or other label), and the machine learning may generate a label prediction as the output. The label prediction may be fed back to the machine learning model as input along with the actual associated label (or other reference feedback) to train the machine learning model. In another use case, the machine learning model may update its configurations (e.g., weights, biases, or other parameters) based on its assessment of its prediction and the reference feedback information. In another use case, where the machine learning model is a neural network, connection weights may be adjusted to reconcile differences between the neural network's prediction and the reference feedback.

In some embodiments, after obtaining filtered light (e.g., subsequently filtered light captured by a camera and processed as an image), data conversion subsystem 114 may obtain one or more vector representations related to the filtered light (e.g., via one or more encoders). Model subsystem 116 may use one or more machine learning models to obtain one or more respective predictions (e.g., a set of predicted activities and respective confidence scores associated with the predicted activities) that are used to assess whether such activities (e.g., an intrusion event or other adverse event) occurred. In one use case, when devices (e.g., laser source, collection devices, etc.) are manufactured with similar components, have similar tolerances for filter distances and other similar characteristics, etc., the images may use the same or similar focal point boundaries locations/sizes and similar second "outer" boundaries. In this way, for example, the machine learning machines can be trained or configured with training data derived from devices (e.g., collection devices) having the same manufacturer (or a few different manufacturers), but still be usable to accurately generate predictions for data derived from devices created by a larger set of different manufacturers.

In some embodiments, prior to generating the vector representations of the filtered light from an image of the filtered light (and providing the vector representations to a machine learning model), data conversion subsystem 114 may transform the image of the filtered light based on a device identifier, a device type, a manufacturer identifier, or device configuration information associated with the laser source or the collection device (e.g., used to facilitate capturing of the image). As an example, data conversion subsystem 114 may transform images captured by devices from different manufacturers such that the images have similar focal point boundaries locations/sizes and similar second "outer" boundaries. Thus, for example, the set of devices (e.g., collection devices) from which data may be obtained (e.g., to create training datasets for machine learning machines) can be further expanded to devices from additional manufacturers and still be useable to accurately generate predictions for data derived from devices created by a larger set of different manufacturers.

In some embodiments, model subsystem 116 may provide one or more services (e.g., cloud-based services) through which new machine learning models (or updated versions thereof) may be obtained and provided to one or more users (e.g., customer systems that use such activity detection systems). In some embodiments, raw data captured by the different devices (e.g., by different manufacturers) may be obtained and used to train or configure one or more machine learning models or other prediction models. As discussed above, even when there are differences across devices and manufacturers, the raw data may be transformed into a normalized form (e.g., where the resulting images have similar focal point boundaries, locations/sizes, and similar second "outer" boundaries). As such, this would allow contributions toward a larger or more comprehensive model that could be shared by a community of users.

In some embodiments, data conversion subsystem 114 may extract a first subset of the filtered light (e.g., based on predetermined reference coordinates for a first focal-point-related boundary), a second subset of the filtered light (e.g., based on predetermined reference coordinates for a second boundary around the first boundary), a third subset of the filtered light (e.g., based on predetermined reference coordinates for a third boundary around the second boundary), and so on. Data conversion subsystem 114 may generate a first vector representation of the first subset of the filtered light, a second vector representation of the second subset of the filtered light, a third vector representation of the third subset of the filtered light, and so on. Model subsystem 116 may obtain, via a machine learning model, one or more predictions related to one or more activities based on the vector representations, and detection subsystem 112 may use the predictions to assess whether such activities (e.g., an intrusion event or other adverse event) occurred. In some embodiments, model subsystem 116 may input one or more of the vector representations (e.g., of the respective subsets of the filtered light captured as image data) into the machine learning model to obtain the related predictions (e.g., a set of predicted activities and respective confidence scores associated with the predicted activities).

In some embodiments, after obtaining filtered light (e.g., subsequently filtered light captured by a camera and processed as an image), data conversion subsystem 114 may obtain one or more vector representations of one or more respective subsets of the filtered light (e.g., based on the respective reference coordinates for pre-determined boundaries as discussed herein), and model subsystem 116 may use multiple prediction models to obtain respective predictions (e.g., a set of predicted activities and respective confidence scores associated with the predicted activities) that are used to assess whether such activities (e.g., an intrusion event or other adverse event) occurred. In some embodiments, model subsystem 116 may obtain, (i) via a machine learning model, a first prediction related to one or more activities based on the vector representations and (ii) via a statistic model, a second prediction related to the one or more activities based on the same vector representations or different vector representations corresponding to the same subsets of the filtered light (e.g., different encoders for the different models may result in different vector representations, despite representing the same subsets of the filtered light).

It should be noted that, in some embodiments, multiple predictions may be obtained respectively from multiple machine learning models and statistical models (or other non-machine-learning models). In some embodiments, each of the machine learning models and the non-machine learning models may be trained or configured for predictions derived from different types of data (e.g., different types of disturbances, different types of events, different data formats, etc.).

In some embodiments, a first machine learning model may be trained or configured to generate predictions based on one or more types of disturbances, and a first statistical model may be trained or configured to generate predictions based on one or more event types. As an example, the first machine learning model may be trained or configured to detect human-perceivable movement or non-oscillating movement and oscillating motion (e.g., vibrations). As another example, the first statistical model may be trained or configured to detect signal loss (e.g., an absence of signal) that can be determined through simple color analysis. By using a non-machine-learning model for detections/predictions for one or more activities (e.g., in combination with machine learning models for detections/predictions for one or more other activities), computer resource usage along with the corresponding processing time may be reduced (e.g., as compared with using only machine learning models to detect all activities).

In some embodiments, system 100 may be integrated with a variety of network devices to offer alarm detection and alarm response capabilities. In some embodiments, system 100 may integrate with Passive Optical Network (PON) equipment, Optical Circuit Switch equipment, Optical Test Access Point equipment, and Network Analyzers to stop and start data flow to one or more network endpoints, re-route data flow, and record or further analyze data when alarms are detected and resolved. In some embodiments, system 100 may handle the coordination of tasks between dark fiber alarm monitoring devices and PON equipment through backend adapters leveraging Simple Network Management Protocol (SNMP) traps and Secure Shell (SSH) protocols. In some embodiments, system 100 may provide the ability for complete network mapping of components starting from a source Optical Line Terminal (OLT) down to an end user Optical Network Terminal (ONT).

In some embodiments, detection subsystem 112 may cause shutdown of network dataflow to one or more network endpoints proximate to a detected disturbance on a physical transmission line. As an example, detection subsystem 112 may monitor the physical information transmission line. When detection subsystem 112 has detected a disturbance on the physical information transmission line (e.g., based on techniques described herein via the collection devices 108*a*-108*n* or via one or more other sensors), detection subsystem 114 may trigger a network data flow shutdown response. As a further example, detection subsystem 114 may determine a location of the detected disturbance on the physical transmission line, and initiate shutdown of the network data flow to the network endpoints proximate to the determined location of the detected disturbance (e.g., the network endpoints within a threshold number of connections or distance of the detected disturbance). In one scenario, the initiation of the shutdown of the network data flow may include transmitting a port disabling command to a data flow control switch to disable a port associated with the network endpoints, rerouting at least a portion of the network data flow to avoid the network endpoints, or other actions.

Example Flowcharts

Figure 11:
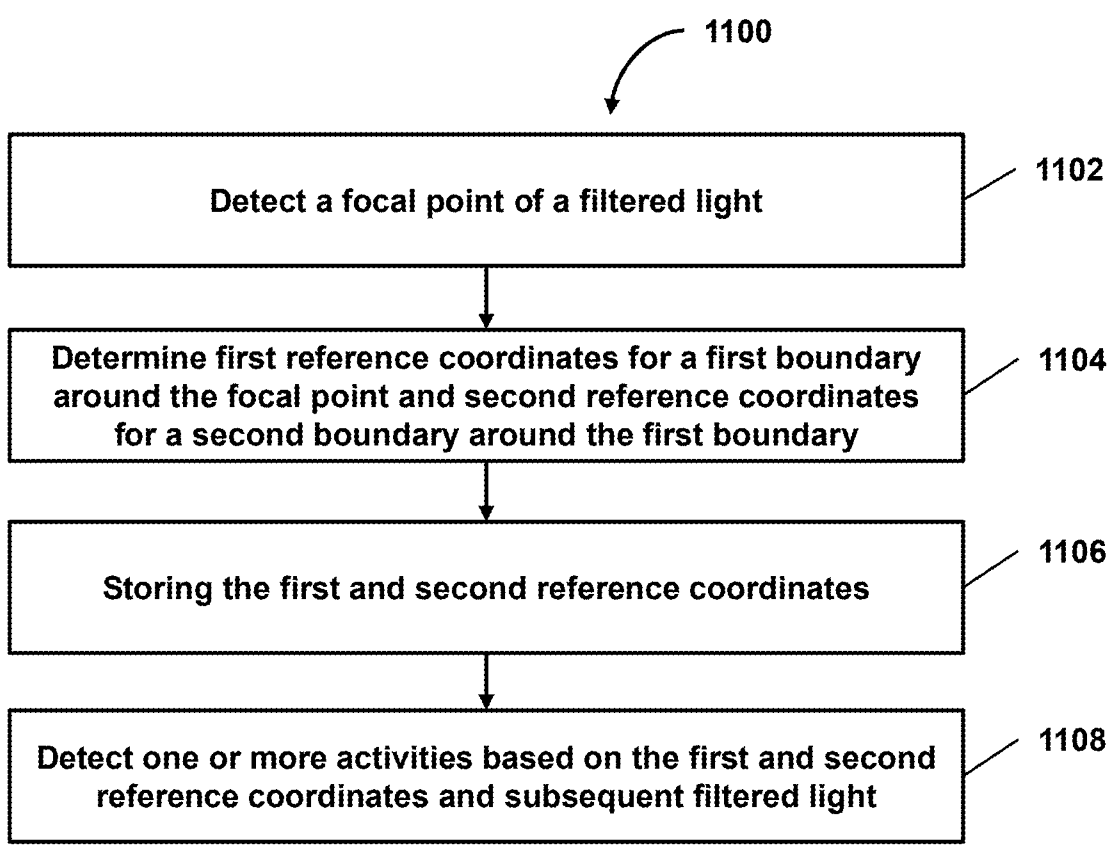
FIG. 11 shows a flowchart of a method of facilitating activity detection, in accordance with one or more embodiments.

FIG. 11 is an example flowchart of processing operations of a method 1100 that enable the various features and functionality of the system as described in detail above. The processing operations of the method presented below are intended to be illustrative and non-limiting. In some embodiments, for example, the method may be accomplished with one or more additional operations not described and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In operation 1102, a focal point of a filtered light may be detected. As an example, the filtered light may be captured by a sensor at a first time. As another example, the filtered light may be light that passes through one or more filters from light emitted from a fiber optic cable or other light carrier or emitter. In one use case, the filtered light may be a second filtered light captured by a camera or other sensor, where the second filtered light is light that passes through a second filter from a first filtered light, and where the first filtered light is light that passes through a first filter from light emitted from the fiber optic cable. In a further use case, the first filter may be a first translucent filter configured to transform light emitted from the fiber optic cable into a first transformed light (e.g., the first filtered light), and the second filter may be a second translucent filter configured to transform the first transformed light into a second transformed light (e.g., the second filtered light). As an example, each of the translucent filters may have different indices of refraction, thereby transforming light as it passes through the translucent filter. Operation 1102 may be performed by a subsystem that is the same as or similar to detection subsystem 112, in accordance with one or more embodiments.

In operation 1104, first and second reference coordinates may be determined, where the first reference coordinates are for a first boundary around the focal point, and the second reference coordinates are for a second boundary around the first boundary. As an example, the second boundary may be a subset of the background (e.g., smaller than the background) that is farther from a center of the focal point than the first boundary. Operation 1104 may be performed by a subsystem that is the same as or similar to detection subsystem 112, in accordance with one or more embodiments.

In operation 1106, the first and second reference coordinates may be stored. As an example, the first and second reference coordinates may be stored in one or more databases and later used to efficiently detect a focal point of emitted or filtered light or a given subset of the background around the focal point and extract data related to light within the first and second boundaries, respectively. As an example, the first reference coordinates for the first boundary may be used to efficiently detect a focal point of subsequent filtered light extract data related to the focal point (e.g., or data related to other light that is scattered around the focal point within the first boundary, data related to lack of a color within the first boundary that corresponds to the focal point color or to the light scatter color, etc.). The second reference coordinates for the second boundary may be used to efficiently detect a given portion of the background around the focal point and extract data related to the portion of the background (e.g., or data related to the focal point with respect to the second boundary, data related to other light that is scattered around the focal point within the second boundary, data related to lack of a color within the second boundary that corresponds to the focal point color or to the light scatter color, etc.). Operation 1106 may be performed by a subsystem that is the same as or similar to detection subsystem 112, in accordance with one or more embodiments.

In operation 1108, based on the first and second reference coordinates, one or more activities may be detected. As an example, subsequent filtered light may be monitored based on the first and second reference coordinates to perform such activity detection. Operation 1108 may be performed by a subsystem that is the same as or similar to detection subsystem 112, in accordance with one or more embodiments.

In some embodiments, with respect to operation 1108, a first dataset may be generated based on the subsequent filtered light and the first reference coordinates, and a second dataset may be generated based on the subsequent filtered light and the second reference coordinate. As an example, the first dataset may include first color composition data corresponding to the first boundary, and the second dataset may include second color composition data corresponding to the second boundary. The activity detection may be performed via a prediction model based on the first color composition data and the second color composition data.

In some embodiments, with respect to operation 1108, first and second boundary datasets may be generated, and the activity detection may be performed via a prediction model based on the first and second boundary datasets. As an example, the first boundary dataset may include one or more of (i) a dataset related to amounts or locations of a first color within the first boundary, (ii) a dataset related to amounts or locations of a second color within the first boundary, or (iii) a dataset related to an extent/amount or locations of lack of the first color and the second color within the first boundary (e.g., where the first color corresponds to the focal point, and the second color corresponds to red light in the subsequent filtered light). As another example, the second boundary dataset may include one or more of (i) a dataset related to amounts or locations of the first color within the second boundary, (ii) a dataset related to amounts or locations of the second color within the second boundary, or (iii) a dataset related to an extent/amount of or locations of lack of the first color and the second color within the second boundary.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, nearfield communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes and is not intended to be limiting, because any of subsystems 112-116 may provide more or less functionality than is described. For example, one or more of subsystems 112-116 may be eliminated, and some or all of its or their functionality may be provided by other subsystems of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: detecting a focal point or a background of a filtered light (e.g., the filtered light being captured by a sensor at a first time, the filtered light being light emitted from a fiber optic cable that passes through one or more light filters, etc.); determining one or more first reference coordinates for a first boundary (e.g., around the focal point) and one or more second reference coordinates for a second boundary (e.g., larger than the first boundary, that is farther from a center of the focal point than the first boundary, etc.); and detecting one or more activities (e.g., a potential intrusion or other potential adverse activity) based on the first and second reference coordinates and subsequent filtered light (e.g., the subsequent filtered light comprising the filtered light captured by the sensor after the first time).
2. The method of the preceding embodiment, further comprising: generating (i) a first dataset based on the subsequent filtered light and the first reference coordinates and (ii) a second dataset based on the subsequent filtered light and the second reference coordinates, the first dataset comprising first color composition data corresponding to the first boundary, the second dataset comprising second color composition data corresponding to the second boundary; and detecting, via a prediction model, the one or more activities based on the first dataset and the second dataset.
3. The method of any of the preceding embodiments, further comprising: generating a first boundary dataset comprising one or more of (i) a first dataset related to first amounts or locations of a first color within the first boundary, (ii) a second dataset related to second amounts or locations of a second color within the first boundary, or (iii) a third dataset related to an extent/amount or locations of lack of the first color and the second color within the first boundary, the first color corresponding to the focal point, the second color corresponding to scatter light in the subsequent filtered light that passes through the one or more light filters; generating a second boundary dataset comprising one or more of (i) a fourth dataset related to third amounts or locations of the first color within the second boundary, (ii) a fifth dataset related to fourth amounts or locations of the second color within the second boundary, or (iii) a sixth dataset related to an extent/amount of or locations of lack of the first color and the second color within the second boundary; and detecting, via a prediction model, the one or more activities based on the first and second boundary datasets.
4. The method of any of the preceding embodiments, further comprising: extracting, from the subsequent filtered light, a first subset of the subsequent filtered light and a second subset of the subsequent filtered light, the first subset being a subset extracted from the subsequent filtered light based on the stored first reference coordinates for the first boundary around the focal point, the second subset being a subset extracted from the subsequent filtered light based on the stored second reference coordinates for the second boundary; and obtaining, via a machine learning model, a prediction related to the one or more activities based on a first vector representation of the first subset of the subsequent filtered light and a second vector representation of the second subset of the subsequent filtered light.

5. The method of any of the preceding embodiments, further comprising: extracting, from the subsequent filtered light, a first subset of the subsequent filtered light and a second subset of the subsequent filtered light, the first subset being a subset extracted from the subsequent filtered light based on the stored first reference coordinates for the first boundary around the focal point, the second subset being a subset extracted from the subsequent filtered light based on the stored second reference coordinates for the second boundary; obtaining, via a machine learning model, a first prediction related to the one or more activities based on a first vector representation of the first subset of the subsequent filtered light and a second vector representation of the second subset of the subsequent filtered light; obtaining, via a statistical model, a second prediction related to the one or more activities based on a third vector representation of the first subset of the subsequent filtered light and the fourth vector representation of the second subset of the subsequent filtered light; and detecting the one or more activities based on the first and second predictions respectively obtained via the machine learning model and the statistical model.

6. The method of any of the preceding embodiments, wherein detecting the focal point or the background of the filtered light comprises detecting the focal point and the background of a second filtered light captured by the sensor at the first time, the second filtered light being light from a first filtered light that passes through a second light filter, the first filtered light being light emitted from a fiber optic cable that passes through a first light filter.

7. The method of any of the preceding embodiments, wherein the one or more light filters comprise one or more translucent filters (e.g., two or more translucent filters, three or more translucent filters, and so on).

8. The method of any of the preceding embodiments, wherein the one or more light filters comprise a first translucent filter (e.g., having different indices of refraction) configured to transform light emitted from the fiber optic cable into a first transformed light and a second translucent filter (e.g., having different indices of refraction) configured to transform the first transformed light into a second transformed light (e.g., the second transformed light comprising the focal point, a laser scatter pattern, etc.), and wherein the filtered light is the second transformed light.

9. The method of the preceding embodiment 8, wherein a surface of the second translucent filter is closer to the sensor than to the first translucent filter.

10. The method of the preceding embodiment 8, wherein a surface of the second translucent filter is 2-3 mm from the sensor and 14-18 mm from the first translucent filter.

11. The method of the preceding embodiment 8, wherein a surface of the second translucent filter is between 5-8 times closer to the sensor than to the first translucent filter (e.g., at least 6 times closer, at least 7 times closer, etc.).

12. The method of the preceding embodiment 8, wherein a surface of the second translucent filter is farther from the sensor than from the first translucent filter.

13. The method of any of the preceding embodiments 8-12, wherein a surface of the first translucent filter is closer to the fiber optical cable than to the second translucent filter.

14. The method of any of the preceding embodiments 8-12, wherein a surface of the first translucent filter is farther from the fiber optical cable than from the second translucent filter.

15. A tangible, non-transitory, machine-readable medium storing instructions that, when executed by a data processing apparatus, cause the data processing apparatus to perform operations comprising those of any of the foregoing method embodiments.

16. A system comprising: one or more processors; and memory storing instructions that, when executed by the processors, cause the processors to effectuate operations comprising those of any of the foregoing method embodiments.

What is claimed is:

1. A system for modular creation of translucent-filtered focal point and laser scatter patterns from light emitted from one or more fiber optic cables and detection therefrom, the system comprising:

modular devices, wherein each modular device of the modular devices comprises:

a cable input slot configured to receive a fiber optic cable at a first opening of the cable input slot that is opposite a second opening of the cable input slot;

a first translucent filter having different indices of refraction and configured to transform light emitted from the fiber optic cable into a first transformed light;

a second translucent filter having different indices of refraction and configured to transform the first transformed light into a second transformed light, the second transformed light comprising a focal point and a laser scatter pattern; and a camera configured to capture the second transformed light, wherein a surface of the second translucent filter is closer to the camera than to the first translucent filter; and one or more processors programmed with computer program instructions that, when executed, cause operations comprising:

detecting the focal point and a background of the second transformed light captured by the camera at a first time, the background comprising the laser scatter pattern;

storing, in memory, focal reference coordinates for a first boundary around the focal point and sub-background reference coordinates for a second boundary that are farther from the focal point than the focal reference coordinates, the second boundary being smaller than the background; and subsequent to storing the focal and sub-background reference coordinates, monitoring subsequent transformed light using the stored focal and sub-background reference coordinates and detecting, via a prediction model, an adverse activity based on the monitoring, the subsequent transformed light comprising the second transformed light captured by the camera after the first time.

2. The system of claim 1, wherein detecting the adverse activity comprises:

generating (i) a focal time-series dataset using the subsequent transformed light and the focal reference coordinates and (ii) a sub-background time-series dataset using the subsequent transformed light and the sub-background reference coordinates, the focal time-series dataset comprising first color composition data corresponding to the first boundary over multiple times within a time period, the sub-background time-series dataset comprising second color composition data corresponding to the second boundary over multiple times within the time period; and inputting the focal time-series dataset and the sub-background time-series dataset into an anomaly detection model to detect the adverse activity.

3. The system of claim 1, wherein detecting the adverse activity comprises:

generating (i) a first focal time-series dataset related to first relative amounts of a first color within the first boundary, (ii) a second focal time-series dataset related to second relative amounts of a second color within the first boundary, and (iii) a third focal time-series dataset related to lack of the first color and the second color within the first boundary, the first color corresponding to the focal point, the second color corresponding to laser scatter light in the subsequent transformed light that passes through the second translucent filter;

generating (i) a first sub-background time-series dataset related to third relative amounts of the first color within the second boundary, (ii) a second sub-background time-series dataset related to fourth relative amounts of the second color within the second boundary, and (iii) a third sub-background time-series dataset related to lack of the first color and the second color within the second boundary; and inputting the focal time-series datasets and the sub-background time-series datasets into an anomaly detection model to detect the adverse activity.

4. The system of claim 1, wherein detecting the adverse activity comprises:

extracting, from the subsequent transformed light, a first subset of the subsequent transformed light and a second subset of the subsequent transformed light, the first subset being a subset extracted from the subsequent transformed light based on the stored first reference coordinates for the first boundary around the focal point, the second subset being a subset extracted from the subsequent transformed light based on the stored second reference coordinates for the second boundary;

inputting a first vector representation of the first subset of the subsequent transformed light and a second vector representation of the second subset of the subsequent transformed light into a machine learning model to obtain predictions related to one or more activities; and detecting the adverse activity using the predictions related to the one or more activities.

5. The system of claim 1, wherein detecting the adverse activity comprises:

extracting, from the subsequent transformed light, a first subset of the subsequent transformed light and a second subset of the subsequent transformed light, the first subset being a subset extracted from the subsequent transformed light based on the stored first reference coordinates for the first boundary around the focal point, the second subset being a subset extracted from the subsequent transformed light based on the stored second reference coordinates for the second boundary;

inputting a first vector representation of the first subset of the subsequent transformed light and a second vector representation of the second subset of the subsequent transformed light into a machine learning model to obtain a first prediction related to one or more activities;

inputting a third vector representation of the first subset of the subsequent transformed light and a fourth vector representation of the second subset of the subsequent transformed light into a statistical model to obtain a second prediction related to the one or more activities; and detecting the one or more activities based on the first and second predictions respectively obtained via the machine learning model and the statistical model.

6. A method comprising:

detecting a focal point and a background of a second transformed light captured by a camera at a first time, the second transformed light being light from a first transformed light that passes through a second translucent filter, the first transformed light being light emitted from a fiber optic cable that passes through a first translucent filter;

storing first reference coordinates for a first boundary around the focal point and second reference coordinates for a second boundary that are farther from a center of the focal point than the first reference coordinates, the second boundary being smaller than the background; and subsequent to storing the first and second reference coordinates, detecting one or more activities based on the stored first and second reference coordinates and subsequent transformed light, the subsequent transformed light comprising the second transformed light captured by the camera after the first time.

7. The method of claim 6, wherein detecting the one or more activities comprises:

generating (i) a first time-series dataset based on the subsequent transformed light and the first reference coordinates and (ii) a second time-series dataset based on the subsequent transformed light and the second reference coordinates, the first time-series dataset comprising first color composition data corresponding to the first boundary over multiple times within a time period, the second time-series dataset comprising second color composition data corresponding to the second boundary over multiple times within the time period; and detecting, via a prediction model, the one or more activities based on the first time-series dataset and the second time-series dataset.

8. The method of claim 6, wherein detecting the one or more activities comprises:

generating a first boundary time-series dataset comprising one or more of (i) a first time-series dataset related to first amounts of a first color within the first boundary, (ii) a second time-series dataset related to second amounts of a second color within the first boundary, or (iii) a third time-series dataset related to lack of the first color and the second color within the first boundary, the first color corresponding to the focal point, the second color corresponding to scatter light in the subsequent transformed light that passes through the second translucent filter;

generating a second boundary time-series dataset comprising one or more of (i) a fourth time-series dataset related to third amounts of the first color within the second boundary, (ii) a fifth time-series dataset related to fourth amounts of the second color within the second boundary, or (iii) a sixth time-series dataset related to lack of the first color and the second color within the second boundary; and detecting, via a prediction model, the one or more activities based on the first and second boundary time-series datasets.

9. The method of claim 6, wherein detecting the one or more activities comprises:

generating a first boundary time-series dataset comprising at least two of (i) a first time-series dataset related to first amounts of a first color within the first boundary, (ii) a second time-series dataset related to second amounts of a second color within the first boundary, or (iii) a third time-series dataset related to lack of the first color and the second color within the first boundary, the first color corresponding to the focal point, the second color corresponding to scatter light in the subsequent transformed light that passes through the second translucent filter;

generating a second boundary time-series dataset comprising at least two of (i) a fourth time-series dataset related to third amounts of the first color within the second boundary, (ii) a fifth time-series dataset related to fourth amounts of the second color within the second boundary, or (iii) a sixth time-series dataset related to lack of the first color and the second color within the second boundary; and detecting, via a prediction model, the one or more activities based on the first and second boundary time-series datasets.

10. The method of claim 6, wherein detecting the one or more activities comprises:

generating a first boundary time-series dataset comprising (i) a first time-series dataset related to first amounts of a first color within the first boundary, (ii) a second time-series dataset related to second amounts of a second color within the first boundary, and (iii) a third time-series dataset related to lack of the first color and the second color within the first boundary, the first color corresponding to the focal point, the second color corresponding to scatter light in the subsequent transformed light that passes through the second translucent filter;

generating a second boundary time-series dataset comprising (i) a fourth time-series dataset related to third amounts of the first color within the second boundary, (ii) a fifth time-series dataset related to fourth amounts of the second color within the second boundary, and (iii) a sixth time-series dataset related to lack of the first color and the second color within the second boundary; and detecting, via a prediction model, the one or more activities based on the first and second boundary time-series datasets.

11. The method of claim 6, wherein detecting the one or more activities comprises:

extracting, from the subsequent transformed light, a first subset of the subsequent transformed light and a second subset of the subsequent transformed light, the first subset being a subset extracted from the subsequent transformed light based on the stored first reference coordinates for the first boundary around the focal point, the second subset being a subset extracted from the subsequent transformed light based on the stored second reference coordinates for the second boundary; and obtaining, via a machine learning model, a prediction related to the one or more activities based on a first vector representation of the first subset of the subsequent transformed light and a second vector representation of the second subset of the subsequent transformed light.

12. The method of claim 6, wherein detecting the one or more activities comprises:

extracting, from the subsequent transformed light, a first subset of the subsequent transformed light and a second subset of the subsequent transformed light, the first subset being a subset extracted from the subsequent transformed light based on the stored first reference coordinates for the first boundary around the focal point, the second subset being a subset extracted from the subsequent transformed light based on the stored second reference coordinates for the second boundary;

obtaining, via a machine learning model, a first prediction related to the one or more activities based on a first vector representation of the first subset of the subsequent transformed light and a second vector representation of the second subset of the subsequent transformed light;

obtaining, via a statistical model, a second prediction related to the one or more activities based on a third vector representation of the first subset of the subsequent transformed light and a fourth vector representation of the second subset of the subsequent transformed light; and detecting the one or more activities based on the first and second predictions respectively obtained via the machine learning model and the statistical model.

13. A non-transitory computer-readable media storing instructions that, when executed by one or more processors, cause operations comprising:

detecting a focal point and a background of a filtered light captured by a sensor at a first time, the filtered light being light emitted from a fiber optic cable that passes through one or more light filters;

storing first reference coordinates for a first boundary around the focal point and second reference coordinates for a second boundary that are farther from a center of the focal point than the first reference coordinates, the second boundary corresponding to a subset of the background; and subsequent to storing the first and second reference coordinates, detecting one or more activities based on the stored first and second reference coordinates and subsequent filtered light, the subsequent filtered light comprising the filtered light captured by the sensor after the first time.

14. The media of claim 13, wherein detecting the one or more activities comprises:

generating (i) a first dataset based on the subsequent filtered light and the first reference coordinates and (ii) a second dataset based on the subsequent filtered light and the second reference coordinates, the first dataset comprising first color composition data corresponding to the first boundary, the second dataset comprising second color composition data corresponding to the second boundary; and detecting, via a prediction model, the one or more activities based on the first dataset and the second dataset.

15. The media of claim 13, wherein detecting the one or more activities comprises:

generating a first boundary dataset comprising one or more of (i) a first dataset related to first amounts of a first color within the first boundary, (ii) a second dataset related to second amounts of a second color within the first boundary, or (iii) a third dataset related to lack of the first color and the second color within the first boundary, the first color corresponding to the focal point, the second color corresponding to scatter light in the subsequent filtered light that passes through the one or more light filters;

generating a second boundary dataset comprising one or more of (i) a fourth dataset related to third amounts of the first color within the second boundary, (ii) a fifth dataset related to fourth amounts of the second color within the second boundary, or (iii) a sixth dataset related to lack of the first color and the second color within the second boundary; and detecting, via a prediction model, the one or more activities based on the first and second boundary datasets.

16. The media of claim 13, wherein detecting the one or more activities comprises:

generating a first boundary dataset comprising at least two of (i) a first dataset related to first amounts of a first color within the first boundary, (ii) a second dataset related to second amounts of a second color within the first boundary, or (iii) a third dataset related to lack of the first color and the second color within the first boundary, the first color corresponding to the focal point, the second color corresponding to scatter light in the subsequent filtered light that passes through the one or more light filters;

generating a second boundary dataset comprising at least two of (i) a fourth dataset related to third amounts of the first color within the second boundary, (ii) a fifth dataset related to fourth amounts of the second color within the second boundary, or (iii) a sixth dataset related to lack of the first color and the second color within the second boundary; and detecting, via a prediction model, the one or more activities based on the first and second boundary datasets.

17. The media of claim 13, wherein detecting the one or more activities comprises:

generating a first boundary dataset comprising (i) a first dataset related to first amounts of a first color within the first boundary, (ii) a second dataset related to second amounts of a second color within the first boundary, and (iii) a third dataset related to lack of the first color and the second color within the first boundary, the first color corresponding to the focal point, the second color corresponding to scatter light in the subsequent filtered light that passes through the one or more light filters;

generating a second boundary dataset comprising (i) a fourth dataset related to third amounts of the first color within the second boundary, (ii) a fifth dataset related to fourth amounts of the second color within the second boundary, and (iii) a sixth dataset related to lack of the first color and the second color within the second boundary; and detecting, via a prediction model, the one or more activities based on the first and second boundary datasets.

18. The media of claim 13, wherein detecting the one or more activities comprises:

extracting, from the subsequent filtered light, a first subset of the subsequent filtered light and a second subset of the subsequent filtered light, the first subset being a subset extracted from the subsequent filtered light based on the stored first reference coordinates for the first boundary around the focal point, the second subset being a subset extracted from the subsequent filtered light based on the stored second reference coordinates for the second boundary; and obtaining, via a machine learning model, a prediction related to the one or more activities based on a first vector representation of the first subset of the subsequent filtered light and a second vector representation of the second subset of the subsequent filtered light.

19. The media of claim 13, wherein detecting the one or more activities comprises:

extracting, from the subsequent filtered light, a first subset of the subsequent filtered light and a second subset of the subsequent filtered light, the first subset being a subset extracted from the subsequent filtered light based on the stored first reference coordinates for the first boundary around the focal point, the second subset being a subset extracted from the subsequent filtered light based on the stored second reference coordinates for the second boundary;

obtaining, via a machine learning model, a first prediction related to the one or more activities based on a first vector representation of the first subset of the subsequent filtered light and a second vector representation of the second subset of the subsequent filtered light;

obtaining, via a statistical model, a second prediction related to the one or more activities based on a third vector representation of the first subset of the subsequent filtered light and a fourth vector representation of the second subset of the subsequent filtered light; and detecting the one or more activities based on the first and second predictions respectively obtained via the machine learning model and the statistical model.

20. The media of claim 13, wherein detecting the focal point and the background of the filtered light comprises detecting the focal point and the background of a second filtered light captured by the sensor at the first time, the second filtered light being light from a first filtered light that passes through a second light filter, the first filtered light being light emitted from the fiber optic cable that passes through a first light filter.

* * * * *